US012134110B2

(12) United States Patent
Sauer et al.

(10) Patent No.: US 12,134,110 B2
(45) Date of Patent: Nov. 5, 2024

(54) MATERIAL HANDLING APPARATUS AND METHOD FOR AUTOMATIC AND MANUAL SORTING OF ITEMS USING A DYNAMICALLY CONFIGURABLE SORTING ARRAY

(71) Applicant: OPEX Corporation, Moorestown, NJ (US)

(72) Inventors: John Sauer, Moorestown, NJ (US); Monty McVaugh, Moorestown, NJ (US); Kevin Cherry, Moorestown, NJ (US); Alexander Stevens, Moorestown, NJ (US)

(73) Assignee: OPEX Corporation, Moorestown, NJ (US)

( * ) Notice: Subject to any disclaimer, the term of this patent is extended or adjusted under 35 U.S.C. 154(b) by 27 days.

(21) Appl. No.: 18/090,648

(22) Filed: Dec. 29, 2022

(65) Prior Publication Data

US 2023/0294135 A1 Sep. 21, 2023

Related U.S. Application Data

(63) Continuation of application No. 16/871,774, filed on May 11, 2020, now Pat. No. 11,654,456, which is a (Continued)

(51) Int. Cl.
*G06F 7/00* (2006.01)
*B07C 3/00* (2006.01)
(Continued)

(52) U.S. Cl.
CPC ................ *B07C 3/14* (2013.01); *B07C 3/008* (2013.01); *B07C 3/20* (2013.01); *B07C 5/10* (2013.01); *B07C 5/3412* (2013.01); *B07C 5/3422* (2013.01)

(58) Field of Classification Search
CPC .. B07C 3/14; B07C 3/008; B07C 3/20; B07C 5/10; B07C 5/3412; B07C 5/3422; B07C 5/36
(Continued)

(56) References Cited

U.S. PATENT DOCUMENTS 5,794,789 A 8/1998 Payson et al.
6,264,042 B1 7/2001 Cossey, Jr. et al.
(Continued)

FOREIGN PATENT DOCUMENTS

AU 2014216046 9/2014
CA 1242986 10/1988
(Continued)

OTHER PUBLICATIONS

Examination Report issued in India for Application No. 202118029638 on May 4, 2023.

(Continued)

*Primary Examiner* — Yolanda R Cumbess
(74) *Attorney, Agent, or Firm* — Brian K. Dinicola

(57) ABSTRACT

A method and apparatus are provided for sorting items to form groups at respective sort destinations. A scanning station evaluates one or more characteristics of each item fed into the apparatus. The items are loaded onto one of a plurality of independently controlled delivery vehicles. The delivery vehicles are individually driven to sort destinations. Once at the appropriate sort destination, the delivery vehicle ejects the item to the sort destination and returns to receive another item to be delivered. A re-induction conveyor may be provided for receiving select items from the vehicles and conveying the items back to the input station for re-processing. Additionally, a controller is provided to control the movement of the vehicles based on a characteristic each item being delivered by each vehicle. When an item to be (Continued)

manually sorted is encountered, a visual alert aligned with a selected destination is activated until manual transfer is confirmed.

20 Claims, 17 Drawing Sheets

Related U.S. Application Data continuation of application No. 16/658,849, filed on Oct. 21, 2019, now Pat. No. 10,639,678, which is a continuation-in-part of application No. 15/586,204, filed on May 3, 2017, now Pat. No. 11,607,713, said application No. 16/658,849 is a continuation-in-part of application No. PCT/US2017/050294, filed on Sep. 6, 2017, which is a continuation-in-part of application No. PCT/US2017/030930, filed on May 3, 2017.

(60) Provisional application No. 62/331,020, filed on May 3, 2016.

(51) Int. Cl.

| | |
|---|---|
| ***B07C 3/14*** | (2006.01) |
| ***B07C 3/20*** | (2006.01) |
| ***B07C 5/10*** | (2006.01) |
| ***B07C 5/34*** | (2006.01) |
| ***B07C 5/342*** | (2006.01) |

(58) Field of Classification Search

USPC ................. 700/213–214, 216, 223, 226, 230

See application file for complete search history.

(56) References Cited

U.S. PATENT DOCUMENTS

| | | | | |
|---|---|---|---|---|
| 6,370,446 | B1 | 4/2002 | Divine | |
| 6,878,896 | B2 | 4/2005 | Braginsky et al. | |
| 7,246,706 | B1 | 7/2007 | Shakes et al. | |
| 8,244,603 | B1 | 8/2012 | Tang | |
| 8,276,740 | B2 | 10/2012 | Hayduchok et al. | |
| 8,892,240 | B1 | 11/2014 | Vliet | |
| 9,443,222 | B2 | 9/2016 | Singel | |
| 9,827,598 | B2 | 11/2017 | Robbins | |
| 10,494,192 | B2 | 12/2019 | DeWitt et al. | |
| 10,495,723 | B2 | 12/2019 | Loverich | |
| 10,639,678 | B2 | 5/2020 | Cherry et al. | |
| 2002/0117429 | A1 | 9/2002 | Takizawa | |
| 2004/0073333 | A1 | 4/2004 | Brill et al. | |
| 2007/0226088 | A1 | 9/2007 | Miles et al. | |
| 2009/0000912 | A1 | 1/2009 | Battles et al. | |
| 2010/0005003 | A1 | 1/2010 | Cassady et al. | |
| 2011/0066572 | A1 | 3/2011 | Robbins | |
| 2011/0106295 | A1 | 5/2011 | Miranda | |
| 2011/0248083 | A1 | 10/2011 | Bonner et al. | |
| 2014/0031972 | A1 | 1/2014 | DeWitt et al. | |
| 2014/0100998 | A1* | 4/2014 | Mountz ................. | G06Q 10/08 705/28 |
| 2014/0214234 | A1 | 7/2014 | Worsley | |
| 2015/0073587 | A1 | 3/2015 | Vliet et al. | |
| 2016/0355337 | A1 | 12/2016 | Lert | |
| 2017/0320102 | A1 | 11/2017 | McVaugh et al. | |
| 2020/0269284 | A1 | 5/2020 | McVaugh et al. | |

FOREIGN PATENT DOCUMENTS

| | | |
|---|---|---|
| EP | 1084770 | 3/2001 |
| JP | 2002270703 | 11/1990 |
| JP | 05178403 A | 7/1993 |
| JP | 06059314 A | 3/1994 |
| JP | 09239323 | 9/1997 |
| JP | 09301506 | 11/1997 |
| JP | H09301506 | 11/1997 |
| JP | 10301506 | 11/1998 |
| JP | 2000177811 | 6/2000 |
| JP | 2002356210 | 12/2002 |
| JP | 2003201003 | 7/2003 |
| JP | 2005225582 | 8/2005 |
| JP | 2008302988 | 12/2008 |
| JP | 2009280301 | 12/2009 |
| JP | 2010515570 | 5/2010 |
| JP | 5562646 | 7/2014 |
| JP | 2016037335 | 3/2016 |
| JP | 64060502 | 6/2016 |
| KR | 20010078237 | 8/2001 |
| KR | 2007-0079951 | 8/2007 |
| KR | 2007006745 | 12/2007 |
| WO | 00/18520 | 4/2000 |
| WO | 01/10574 | 2/2001 |
| WO | 2008089150 | 7/2008 |
| WO | 2014/116947 | 7/2014 |
| WO | 2017/123678 | 7/2017 |
| WO | 2018203921 | 11/2018 |

OTHER PUBLICATIONS

Examination Report issued in Korea for Application No. 10-2022-7031322 on Apr. 5, 2023.

International Search Report issued in PCT Application No. PCT/US17/13077 on Jun. 28, 2017.

Invitation to Pay Additional Fees/Partial International Search Report issued in PCT Application No. PCT/US17/30930 on Jul. 25, 2017.

Examination Report issued for Application No. 2022200599 in Australia on Mar. 28, 2023.

Examination Report issued for Application No. 10-2022-7031322 in Korea on Nov. 15, 2022.

International Search Report and Written Opinion issued in PCT/US17/30930 on Sep. 18, 2017.

International Search Report and Written Opinion issued in PCT/US17/50294 on Nov. 13, 2017.

Examination Report issued in Europe for Application No. 17724972.9 on Sep. 9, 2020.

Examination Report Issued from Japan in Application No. 2018-556809 on Jan. 4, 2021.

Examination Report Issued from Australia in Application No. 2017260456 on Feb. 9, 2021.

Examination Report Issued in Japan for Patent Application No. 2018-556809 on Sep. 14, 2021.

Examination Report issued in Korea for Patent Application No. 10-2018-7034382 on Nov. 3, 2021.

Examination Report issued in United Kingdom for Application No. GB1915789.0 on Dec. 2, 2021.

Examination Report issued in Japan for Application No. 2021-090133 on Jun. 7, 2022.

Examination Report issued in Singapore for Application No. 11201809314 on Sep. 28, 2022.

Examination Report issued in Great Britain for Application No. GB2212776.5 on Oct. 11, 2022.

Office Action in Japan for Application No. 2022-040163 on Jun. 6, 2023.

Office Action in Korea for Application No. 10-2023-7020130 on Aug. 14, 2023.

Examination Report issued in Korea for Application No. 2023-073845929 on Aug. 14, 2023.

Examination Report issued in Korea for Application No. 2023-092367233 on Oct. 12, 2023.

Examination Report issued in Japan for Application No. 2022-131514 on Oct. 24, 2023.

Search Report issued in Europe for Application No. 23170330.7 on Oct. 17, 2023.

Office Action issued in Korea for Application No. 2023092767754 on Oct. 13, 2023.

Examination Report issued in Canada for Application No. 3060709 on Nov. 8, 2011.

(56) References Cited

OTHER PUBLICATIONS

Office Action issued in Japan for Application No. 2022-040163 on Feb. 13, 2024.

* cited by examiner

9/15

MATERIAL HANDLING APPARATUS AND METHOD FOR AUTOMATIC AND MANUAL SORTING OF ITEMS USING A DYNAMICALLY CONFIGURABLE SORTING ARRAY

REFERENCE TO RELATED APPLICATIONS

The present application is a continuation of U.S. patent application Ser. No. 16/871,774 filed on May 11, 2020, which is a continuation of U.S. patent application Ser. No. 16/658,849 filed on Oct. 21, 2019, which is a continuation-in-part of International Patent Application No. PCT/US17/50294 filed Sep. 6, 2017, which is a continuation-in-part of International Patent Application No. PCT/US17/30930 filed on May 3, 2017. The present application is also a continuation-in-part of co-pending U.S. utility patent application Ser. No. 15/586,204 filed May 3, 2017, which claims priority to U.S. Provisional Application No. 62/331,020 filed May 3, 2016. The entire disclosure of each of the foregoing applications is hereby incorporated herein by reference.

FIELD OF THE INVENTION

The present invention relates to material handling systems and, more particularly, to systems and methods for aggregating items into groups based on automated recognition, detection, and/or characterization processes.

BACKGROUND OF THE INVENTION

The inventors herein have observed that aggregating items into respective groups (e.g., in the fulfillment of corresponding orders items to be shipped to customers or retail points of sale and/or in the processing of returns of such items) can be laborious, time consuming, inefficient, and prone to error. Such disadvantages are most keenly felt when the items must be retrieved from (or returned to) scattered locations within a warehouse or other large facility. A single order fulfillment center may receive hundreds, thousands or more orders a day, with each order requiring one, several, or many different items to be retrieved from inventory. The retrieved items are typically transferred, manually into a parcel or carton. After all the items for an order have been accumulated in this manner, the packaging process is completed.

SUMMARY OF THE INVENTION

Described herein are automated sorting systems and methods by which items of disparate size and/or weight are automatically identified and transported to an array of dynamically reconfigurable sort destinations, based on the identification.

According to one aspect, a method of sorting items to a dynamically reconfigurable sort array structure is provided. The method may include the step of executing instructions stored in memory to activate a visual alert aligned with a first sort destination of the DRSAS when a first item to be transferred manually is detected. Instructions stored in memory are executed to extinguish the visual alert after the first item has been transferred manually to the first sort destination. A second item to be delivered automatically to the first sort destination is received onto a delivery vehicle and the delivery vehicle is advanced along a path to the first sort destination in response to an instruction from the controller. The second item may then be transferred to the first sort destination. The method may optionally include one or more optional steps, including: the step of operating at least one sensor of the delivery vehicle to detect that the first sort destination cannot receive the second item; the step of transmitting to the controller, from the delivery vehicle, a notification that the first sort destination cannot receive the second item; the step of operating a scanner to acquire an identifying indicium from a surface of at least one of the first item or the second item; the step of transmitting, from the scanner to the controller, data representative of identifying indicium associated with the first item; the step of transmitting, from the scanner to a controller of a warehouse management system, data representative of the identifying indicium associated with the first item, wherein optionally the instructions stored in memory to activate the visual alert are executed by the processor based on data transmitted from the scanner; and/or the step of transmitting, from the scanner, data representative of a confirmation that the first item has been transferred to the first sort destination, wherein the instructions stored in memory to extinguish the visual alert are executed by the processor based on data transmitted from the scanner. The method may include one or any combination of the optional steps.

According to another aspect, the present invention provides a method of sorting items using a dynamically reconfigurable sorting array system. The sorting array system may include a plurality of destination areas arranged into a series of columns extending generally vertically, a plurality of delivery vehicles, and an event annunciation system. The method may include the step of transferring, onto a delivery vehicle, an item to be delivered to a first destination area of the plurality of destination areas. The delivery vehicle may be driven along a path to the first destination area. The method may include the step of initiating discharge of an item to the first destination area. Upon detection of an item to be manually delivered to a second destination area of the plurality of destination areas, the method may include the step of operating the event annunciation system to provide a first visible alert. Upon detection of manual delivery of an item to the second destination, the method may include the step of operating the event annunciation system to discontinue the first visible alert and/or provide a second visible alert visibly distinguishable from the first visible alert. Optionally, the method may include the step of operating a sensor of the material handling system to confirm discharge of an item to the first destination area. Additionally, the step of providing the second visible alert may include providing the second visible alert when a last item required to complete a grouping of items at a destination area has been transferred. The method may include one or both of the optional steps.

According to a further aspect, the present invention provides a material handling system for sorting a plurality of items into groups of one or more items. The system may include a plurality of destination areas arranged into a series of columns extending generally vertically and a plurality of visible indicators, wherein at least one visible indicator of the plurality of visible indicators is adjacent to a corresponding destination area of the plurality of destination areas. The system may also include a plurality of delivery vehicles each dimensioned and arranged to receive a respective item of a plurality of items and operable to transport a received item to any destination area of the plurality of destination areas. Each of the vehicles may include a power source for driving the vehicle, and a transfer mechanism operative to transfer a received item to a selected destination area. A controller including a processor is provided for executing instructions stored in memory. The stored instructions may include instructions for activating a first visible indicator of the plurality of visible indicators when a first item to be transferred manually to a first destination area is detected; de-activating the first visible indicator of the plurality of visible indicators when confirmation of manual transfer of the first item is detected; and activating a second visible indicator, adjacent to the first destination area, when the first destination area has accumulated a complete group of items. The system may include additional optional features, such as the memory including instructions executable by the processor for deactivating the second visible indicator when the complete group of items has been removed from the first destination area; the memory including instructions executable by the processor for controlling the movement and operation of each delivery vehicle; and the plurality of destination areas being arranged into a first series of columns extending generally vertically and a second series of columns extending vertically, the system further including a track for guiding the delivery vehicles to the destination areas, wherein the track is positioned between the first series of columns and the second series of columns so that a delivery vehicle can move vertically between the first series of columns and the second series of columns, and wherein when a delivery vehicle is stopped at a point along the track, the transfer mechanism can transfer an item forwardly between the vehicle and a destination area in the first series of columns and the transfer mechanism can transfer an item rearwardly between the vehicle and a destination in the second series of columns. The system may include one or any combination of the optional features.

While the methods and apparatus are described herein by way of example for several embodiments and illustrative drawings, those skilled in the art will recognize that the inventive methods and apparatus for sorting items using a dynamically reconfigurable sorting array are not limited to the embodiments or drawings described. It should be understood, that the drawings and detailed description thereto are not intended to limit embodiments to the particular form disclosed herein. Rather, the intention is to cover all modifications, equivalents and alternatives falling within the spirit and scope of the methods and apparatus for sorting items using one or more dynamically reconfigurable sorting array defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
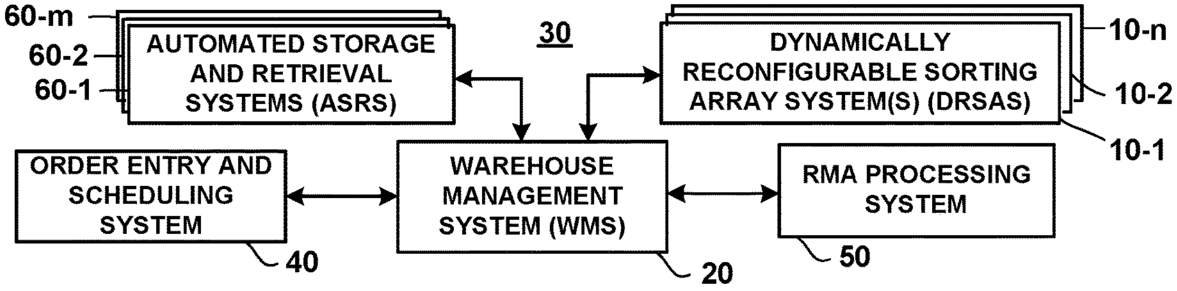
FIG. 1 is a block diagram depicting one or more dynamically reconfigurable sorting array systems operable under the direction of a centralized warehouse management system and forming part of an order fulfillment arrangement, in accordance with an exemplary embodiment consistent with the present disclosure.

Systems and techniques for automating the accumulation of one or more items, at respective sort destinations, to form corresponding groups of items (e.g. for shipment to customers in fulfillment of orders or for batch replenishment of items to inventory) are described. Items are automatically identified by a scanning process as they are conveyed along or passed between conveyor stages of an induct module. Optionally, one or more characteristics (e.g., weight, length, height or width) are determined by reference to data associated with the identification. Additionally, or alternatively, one or more sensors of the induct module may be operated to determine the one or more characteristic(s). In embodiments, the item so identified and/or characterized is transferred from a transfer conveyor of the induct module to an autonomous delivery vehicle movable within an aisle which extends parallel to the vertical array of storage locations. Each delivery vehicle is self-propelled and includes a discharge mechanism for transferring, to a sort location with which it is aligned, the item it received from the induct module and carried to that sort location. In some embodiments, the discharge mechanism is a conveyor configured to move an item along a discharge path transverse to the orientation of the aisle within which the vehicle moves.

In some embodiments, a visible event annunciator comprising an array of light emitting elements is aligned with the respective sort destinations. In an embodiment, each monitored event is assigned a corresponding operating mode of the light emitting elements. For example, in a first operating mode, the elements may be operated to emit a first color (e.g., red) and a first pattern (flashing) during a vehicle jam that prevents that vehicle and any behind it from traversing an aisle or portion of an aisle. In a second operating mode, the elements may be operated to emit a second color (e.g, white) and a second pattern (e.g., solid) to indicate that aggregation of items to form a group, at a sort location, has been completed. In such cases, the second operating mode alerts an operator to the fact that the item, or a bin containing the items, can be removed and transferred to a carton for shipment.

By way of still further illustration, in a third operating mode, the visible event annunciator may cause the light elements aligned with a first zone of sort areas to be illuminated in one color or pattern of colors, and a second zone of sort areas to be illuminated in another color or pattern. The dynamic configuration of zones in this manner facilitates the assignment of different zones to different operators or, alternatively, can serve to delineate zones having different priorities to the fulfillment operation (e.g., those needing to be completed and packed to a truck whose departure from a facility is imminent). Neither the zones, nor the sort destination areas comprising a zone, need be contiguous with one another.

In embodiments, an item required for aggregation at more than one location may be re-routed by re-directing a delivery vehicle to a different sort destination than the destination initially assigned to the delivery vehicle at the time of initial transfer from the induct module. Such redirecting may be responsive to a rearrangement of order priorities, or to an event sensed by the delivery vehicle. For example, the delivery vehicle may determine, by an onboard sensor, that the intended sort destination area is full or overflowing and that a bin typically placed in the intended sort destination area is missing. In embodiments, the detection of such events is reported to a controller of the dynamically reconfigurable sorting array which, in turn executes instructions in memory for generating appropriate instructions to the delivery vehicle and/or event annunciator. In still other embodiments, items are discharged by the vehicles directly into respective shipping cartons, boxes or bags disposed at some or all of the sort destination areas.

FIG. 1 is a block diagram depicting one or more dynamically reconfigurable sorting array systems, indicated generally at 10-1 to 10-*n*, which are operable under the direction of a centralized warehouse management system 20 and forming part of an order fulfillment arrangement 30, in accordance with an exemplary embodiment consistent with the present disclosure. In embodiments consistent with the present disclosure, the order fulfillment arrangement 30 also includes an order entry and scheduling system, indicated generally at 40, a return material authorization (RMA) processing system 50, one or more automated storage and retrieval systems (ASRS) indicated generally at 60-1 to 60-*m*, and in an exemplary embodiment, one or more handheld scanners used to detect a subset of items requiring manual sorting, to confirm their manual placement at respective sort destination areas, and/or to confirm that a destination area has been "swept" of items associated with an order such that the destination area can be re-assigned to the next order in a queue.

Figure 2:
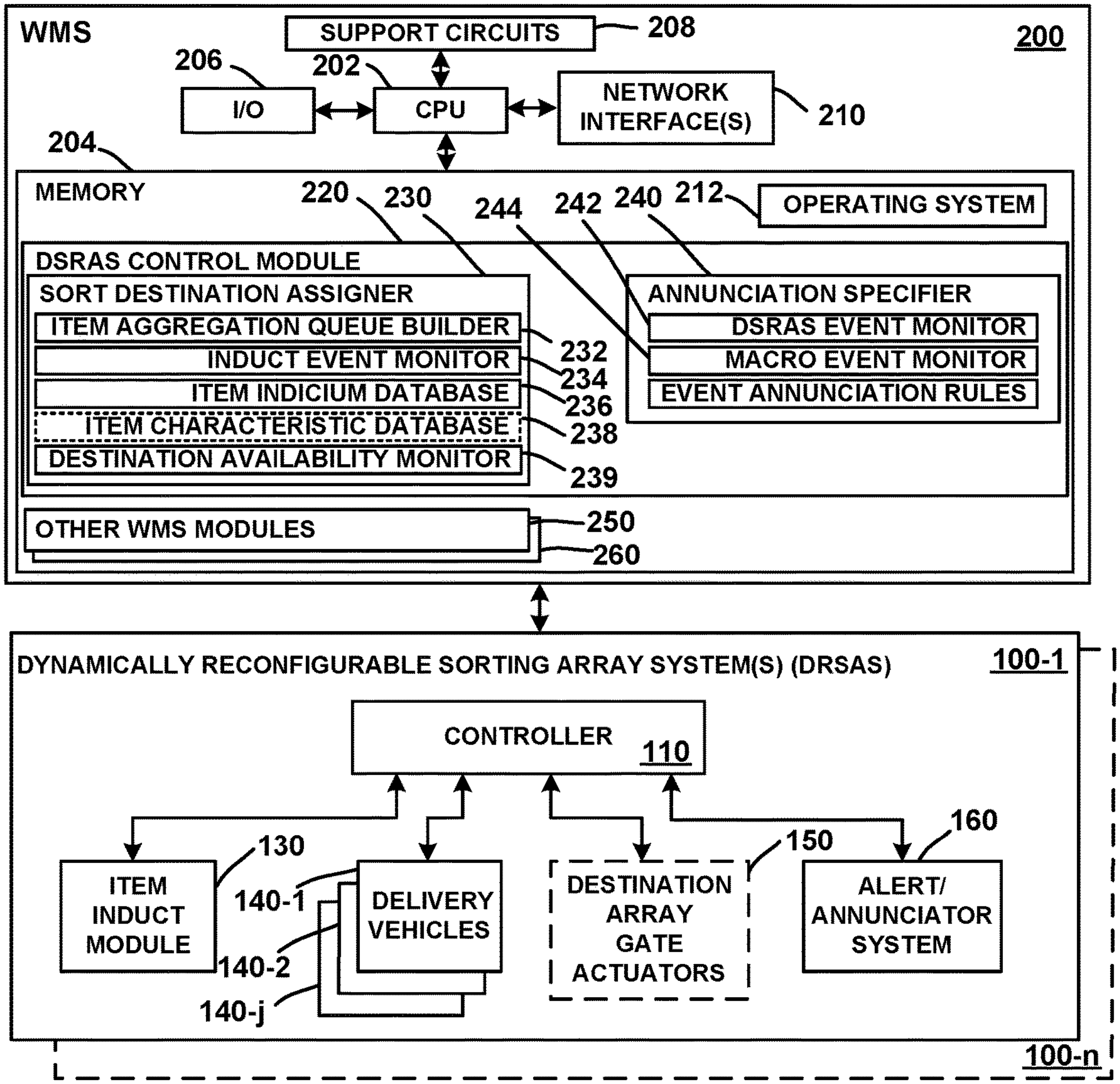
FIG. 2 is a block diagram depicting, in greater detail, a warehouse management system for coordinating the operation of one or more dynamically reconfigurable sorting array system(s), consistent with one or more embodiments of the present disclosure.

FIG. 2 is a block diagram depicting, in greater detail, one or more dynamically reconfigurable sorting array system(s) (DRSAS) as DRSAS systems 100-1 to **100-*n* whose operations are coordinated by a warehouse management system (WMS) 200, as may be performed in the operation of an order fulfillment center such as the order fulfillment center 30 depicted in FIG. 1**.

With continuing reference to the exemplary embodiment of FIG. 2, it will be seen that DRSAS 100-1 includes a controller 110, an item induct module 130, a plurality of self-propelled delivery vehicles indicated generally at reference numerals 140-1 to **140-*j*, and destination array gate actuators which in optional, track guided implementations of the delivery vehicles as vehicle 140-1 are activated by controller 110 as needed to define an appropriate route for routing of each delivery vehicle as it traverses the path which extends from the point at which an item is received from the induct module to the point at which the item is discharged at a sort destination area. In other embodiments, however, the gate mechanisms of the DRSAS are actuated mechanically by the delivery vehicles, rather than by a controller such as controller 110**.

The DRSAS of FIG. 2 further includes, in some embodiments, an alert and/or annunciator system 160. As will be explained in greater detail shortly, in some embodiments the alert/annunciator system is controlled—either by controller 110 and/or by WMS 200—to provide visual indications responsive to a number of monitored events and/or alert presentation requests.

In the embodiment depicted in FIG. 2, WMS 200 serves as a controller which directs the operation of one or more DRSAS systems as system 100-1. To this end, WMS 200 includes a central processing unit (CPU) 202, input/output interfaces 206, support circuits 208, and one or more network interfaces 210. CPU 202 is configured to fetch and execute instructions, stored in memory, to implement a DRSAS control module 220. DRSAS control module 220 comprises a sort designation assigner 230 for specifying the sort area destination(s) to which each item that is the subject of at least one order and/or RMA replenishment procedure is to be delivered. A frequently ordered item may, for example, be needed at more than one sort destination area of a DRSAS. For each order, an item aggregation queue builder 232 designates a list of one or more items which will form a group destined for one or more dynamically assignable sort destination areas.

In some embodiments, the queue builder may assign a first subset of the items of a group to a first sort destination area and a second subset of the items of a group to a second sort destination area. Allocating the items among a plurality of sort destinations may be appropriate, for example, when the volume occupied by all of the items required for a grouping would be too large to be accommodated by a single. Identification of the items, in some embodiments, is facilitated by an item indicium database 236 such as a library of UPC codes which may further include, or be supplemented by, a database of such item characteristics as weight, length, width and height of each item in inventory. In some embodiments, the item characteristics database 238 is constructed by accumulating data reported by induct event monitor 234. By way of illustrative example, in some embodiments, the induct events reported to induct event monitor 234 of WMS 200 may include weight data gathered by weight sensors associated with each induct module 130. Likewise, an appropriately positioned light plane generator, the leading and trailing edges of each item may be detected as they are carried by a feed conveyor of the induct module 130. As such, with knowledge of the conveyor speed, the length of the item might be detected at the induct module and reported as an event to induct event monitor 234.

It will thus be seen that by accumulating and/or analyzing stored information about each item, it is possible for sort destination assigner 230 to determine the number and/or height of the destination sort areas needed for a particular item group. Indeed, such accumulated item characteristic data may be used to enhance the operation of the DRSAS in other ways. For example, in the interest of ergonomic efficiency and the avoidance of back injuries, it may be beneficial for sort destination assigner 230 to assign heavier items or item groups to a height above the floor no higher than 1 to 1.5 meters. Such an assignment may be initiated by execution of instructions stored in memory to form destination availability monitor 239, which tracks which sort destination areas are empty/available at a given instant in time, or it may be initiated merely by selecting one or more sort destination areas meeting the applicable filter criteria—which may include, for example, height above the floor and/or distance to a packaging area—and reserving those destination areas so that they are assigned when they become available.

In addition to sort destination assigner 230, the DRSAS control module of WMS 200 optionally includes, in some embodiments, an alert/annunciation specifier 240 which includes a DRSAS event monitor 242, a macro event monitor, and a data store containing event annunciator rules. In addition, or by way of alternative example, the alert/annunciation specifier may be implemented as part of the DRSAS itself (as will be discussed in connection with FIG. 3, shortly). In any event, and with continued reference to FIG. 2, events monitored by the DRSAS event monitor 242 may include such events as a delivery vehicle jam or stoppage, a full destination sort area, the removal of a bin, carton, or bag from a destination sort area, assignment of one or more sort destination areas to a priority zone, or assignment of one or more sort destination areas to a particular operator or group of operators.

Events monitored by the macro event monitor 244, on the other hand, may include such events as an emergency affecting the entire facility and/or a direction to take a lunch break, coffee break, or other activity of interest not only to the operator(s) and user(s) of the DRSAS, but to others in the vicinity.

Figure 3:
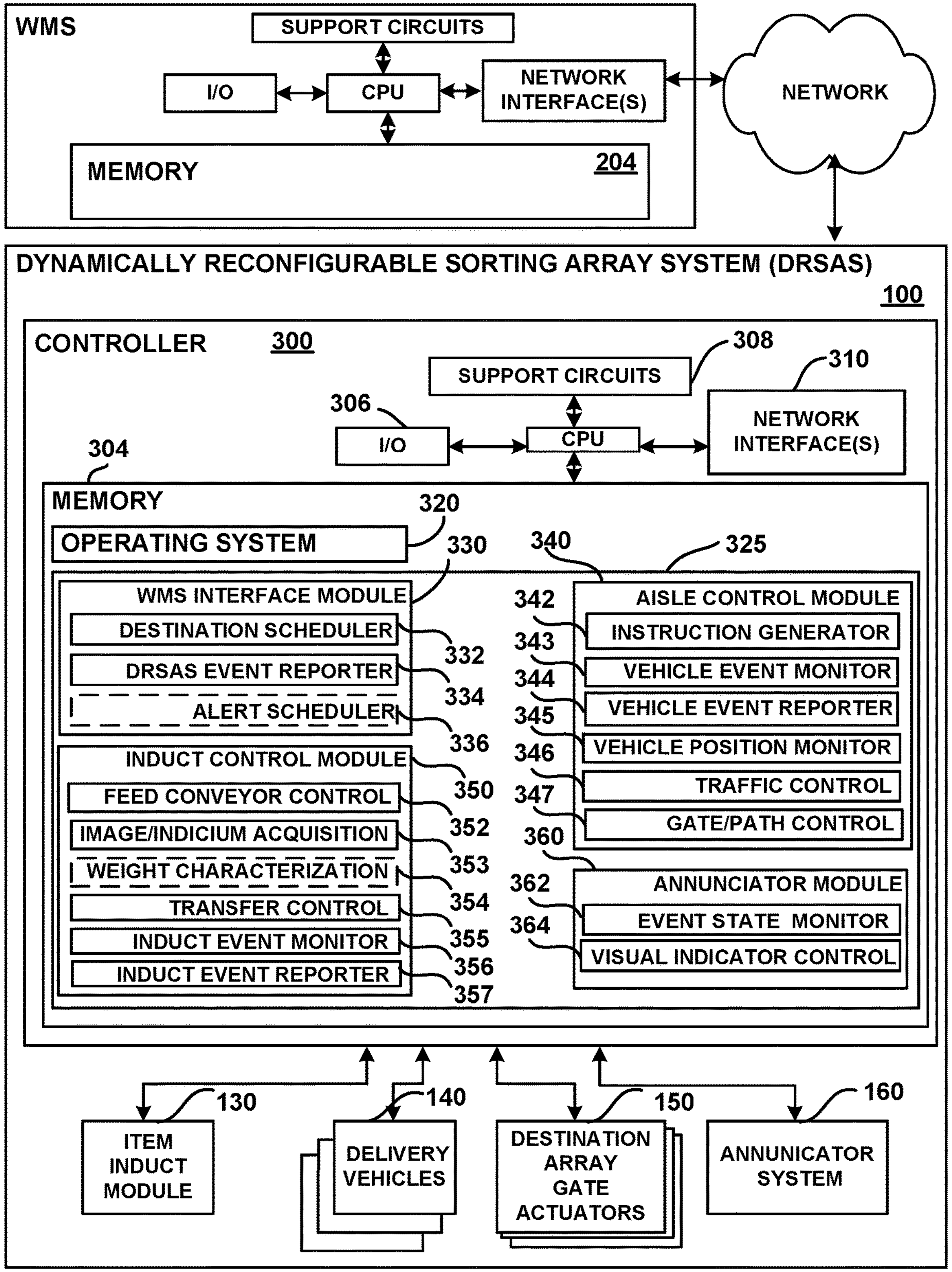
FIG. 3 is a block diagram depicting, in greater detail, a dynamically configurable sorting array system constructed in accordance with an exemplary embodiment of the present disclosure.

FIG. 3 is a block diagram depicting, in greater detail, a dynamically configurable sorting array system 300 constructed in accordance with an embodiment of the present disclosure consistent with the one depicted in FIG. 2 and configured to operate in coordination with WMS 200. As seen in FIG. 3, DRSAS 300 includes a central processing unit (CPU) 302, memory 304, input/output interfaces 306, support circuits 308, and one or more network interfaces 310. CPU 302 is configured to fetch and execute instructions, stored in memory, to implement a DRSAS control module 325. Memory 304 also contains operating system 320.

According to the illustrative embodiment of FIG. 3, DRSAS control module 325 comprises a WMS interface module 330, an induct control module 350, an aisle control module 340, and an annunciator/alert module 360.

WMS interface module 330 facilitates coordination of sort destination assignment, relay of event notifications, and implementation of any alert or annunciation requests initiated by the WMS 200. To this end, the WMS interface module 330 includes a sort destination scheduler 332 which, in some embodiments, implements the sort destination reservations and queuing requests made by the WMS 200. WMS interface module 330 further includes a DRSAS event reporter 334, which reports such events as last item of a group to arrive at a sort destination area, dwell time exceeded (i.e., incomplete groupings of items lingering at a sort destination area beyond a specified time window or threshold), vehicle jams or stoppages, destination sort areas available, etc. Optionally, WMS interface 330 includes an alert scheduler 336 by which, for example, operation of the annunciator system 160 is initiated to enforce the event annunciation rules 246 (FIG. 2) residing in the memory 204 of WMS 200.

With continuing reference to FIG. 3, it will be see that DRSAS 100 further includes an induct control module 350, an aisle control module 340, and an annunciator module 360. Induct control module includes a feed conveyor control module 352, an image/indicium acquisition module 353, weight characterization sensors 354, a transfer control module 355, an induct event monitor 356, and an induct event reporter 357. In embodiments, the induct module 130 one or more feed conveyors and a transfer conveyor for feeding items one at a time, onto a corresponding delivery vehicle. In an embodiment, a feed conveyor control module 352 controls the starting, stopping and speed of the feed conveyor(s) of item induct module 130. In some embodiments, the speed of the feed conveyors is determined based on the weight of the item being conveyed. The inventors herein have observed that an item on the order of 5-8 kilograms, if allowed to travel fast enough upon a feed conveyor or transfer conveyor, will often overshoot the support surface of the delivery vehicle onto which it is to be transferred.

In some embodiments, each delivery vehicle includes an item supporting belt which can be advanced in at least one direction to discharge the item into a sort destination area. Unless an item is slowed to a point that its center of gravity does not shift beyond the edge of the belt surface, it may end up in a reject bin. To avoid this, one or more weight characterization sensors 354 may be positioned underneath the belt of a feed conveyor of the induct module so that a real time determination can be made as to whether an item is heavy enough to warrant retarding the feed rate of the feed conveyor, via feed conveyor control module 352, and/or the feed rate of the transfer conveyor, via transfer control module 355. Induct event monitor 356 monitors such events as successful scanning of an item, failure to scan an item, rejection of two or more items due to them being fed too close together, and successful transfer onto a delivery vehicle, and induct event report reporter 356 reports the event, and any acquired image data, to WMS 200.

Aisle control module 340, in exemplary embodiments consistent with the present disclosure, includes an instruction generator module 342, for formulating instructions to be transmitted (e.g., over a wireless data transmission path) to the delivery vehicles 140. Events detected and/or affecting the vehicles 140 are monitored by vehicle event monitor 343 and, as appropriate, these events are reported to the WMS 200 and/or used to determine when a particular command (e.g., stop) is to be transmitted to the delivery vehicles 140 via network interface(s) 310. A vehicle position monitor 345 of aisle control module 340, in conjunction with traffic control module 346, enables controller 300 to ensure that collisions between delivery vehicles are avoided. Optionally, aisle control module of controller 300 further includes a gate/path control module for opening and closing gates along the tracks which guide each delivery vehicle to an intended sort destination area. Finally, annunciator module 360 includes an event state monitor and visual indicator control for selectively energizing one or more layers of light emitting diodes or other light emitting elements in accordance with a set of event annunciation rules such as the rules 246 stored and enforced by WMS controller 200.

Figure 4A:
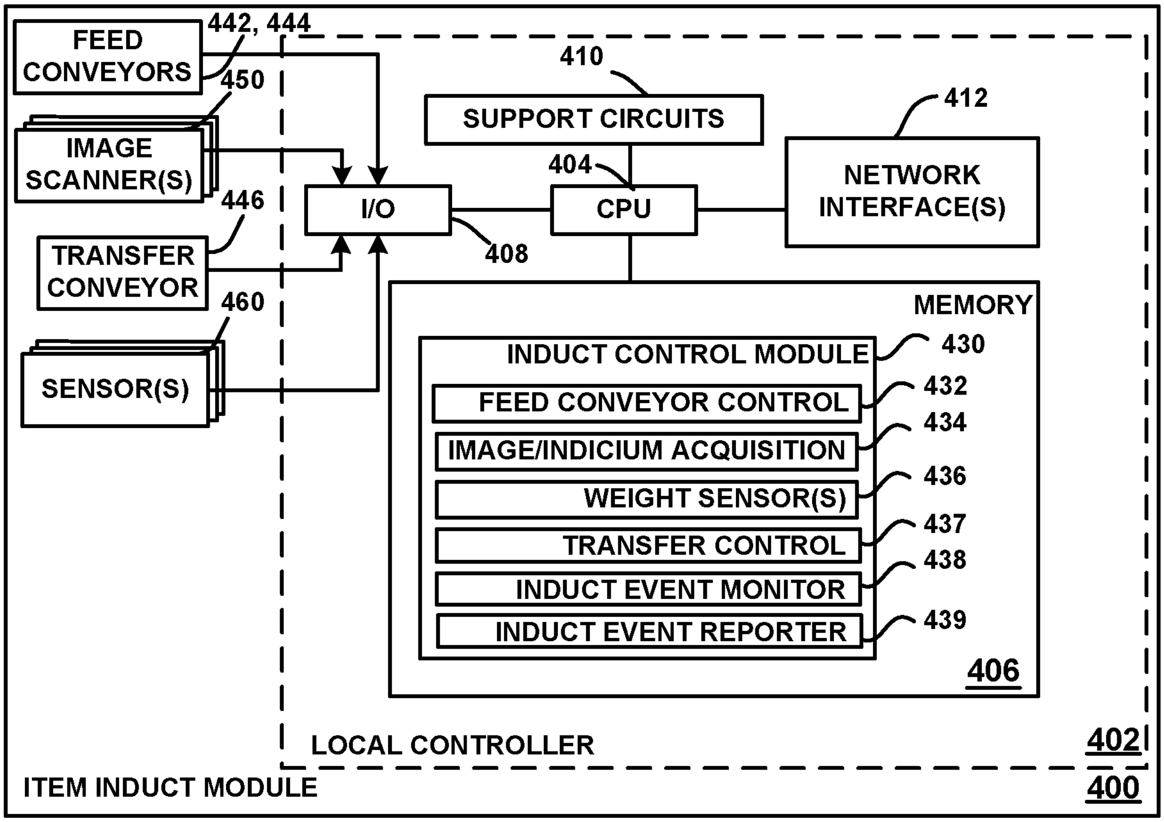
FIG. 4A is a block diagram depicting the functional components of an exemplary item induct module, which may form part of the dynamically configurable sorting array system of FIG. 3 according to one or more embodiments consistent with the present disclosure.

FIG. 4A is a block diagram depicting the functional components of an exemplary item induct module 400, which may form part of the dynamically configurable sorting array system 300 of FIG. 3, according to one or more embodiments consistent with the present disclosure. The arrangement of FIG. 4A contemplates the use of local controllers for performing at least some induct module, aisle, and alert/annunciating control functions. As such, and as seen in FIG. 4, induct module 400 includes a local controller 402, a CPU 404, a memory 406, I/O interfaces 408, support circuits 410, network interfaces 412.

Figure 4B:
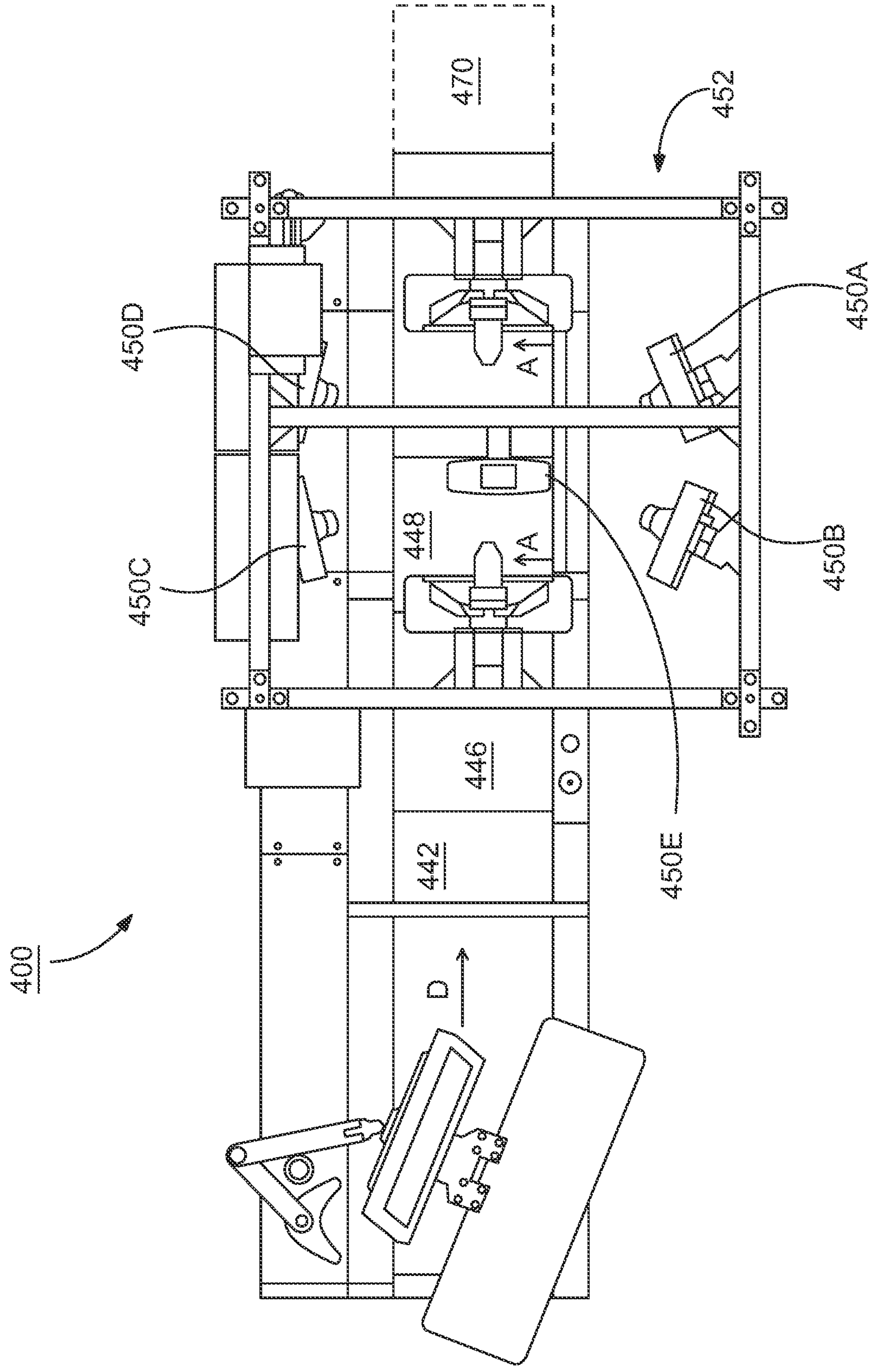
FIG. 4B is a top plan view depicting components of the exemplary item induct module of FIG. 4A, according to one or more embodiments consistent with the present disclosure.

Referring now to FIG. 4A together with FIG. 4B, which is a top plan view depicting components of the exemplary item induct module 400 of FIG. 4A, it will be seen that induct module 400 includes three conveyor stages. A first feed conveyor stage 442, a second conveyor stage 444, and a transfer conveyor stage 446. An item dropped onto the item carrying surface of conveyor stage 442 is advanced in the direction of the arrow D toward the scanning zone of a "tunnel frame" 452. The tunnel frame supports a network of image and/or line scanners 450. In the embodiment of FIG. 4B, an exemplary network of image acquisition scanners includes first and second lateral pairs of scanners indicated at 450A, 450B and 450C, 450D, respectively, whose fields converge at the scanning zone, a downwardly directed scanner 450E above the scanning zone, and in some embodiments, elevated scanners (not shown) whose fields converge at the scanning zone from positions upstream and downstream of the scanning zone.

Figure 4C:
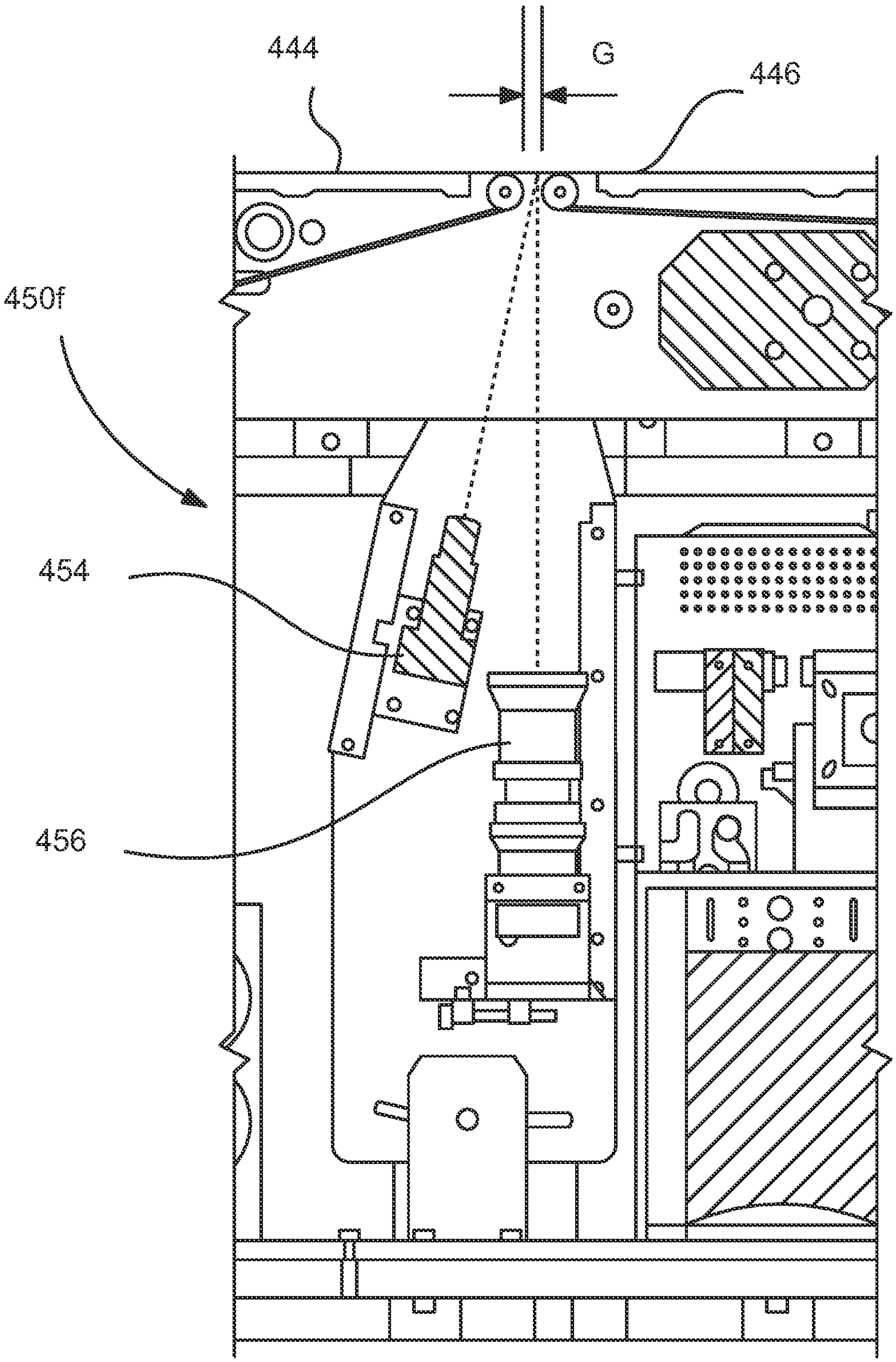
FIG. 4C is a partial side elevation view depicting the arrangement of an exemplary scanning element dimensioned and arranged to acquire an image of an item characterizing indicium as it becomes visible through a gap between conveyor stages of the induct modules, in accordance with one or more embodiments consistent with the present disclosure.

FIG. 4C is a partial side elevation view depicting the arrangement of an exemplary scanning element dimensioned and arranged to acquire an image of an item characterizing indicium as it becomes visible through a gap between conveyor stages of the induct modules, according to some embodiments of the present disclosure. As best seen in FIG. 4C, a gap G is defined between the feed conveyor 444 and the transfer conveyor 446. Through this gap, an additional scanning unit, indicated generally at 450F, which in the illustrative embodiment includes a line projector 454 and an image acquisition lens 456. The gap G is preferably as small as possible to enable items having a relative small dimensional profile to be processed by a DRSAS. In embodiments, a gap on the order of 0.375" (approximately 1 cm) has been observed by the inventors herein to provide acceptable results over commercially acceptable item feed rates (typically on the order of one thousand to two thousand or more items per hour).

It has been observed by the inventors herein that at commercially acceptable feed rates, it is desirable to maintain adequate spacing (typically 0.25 inches or about 64 mm) between items as they are fed into the scanning zone of the induct module 400. Such spacing ensures that the items can be singulated before advancing to a loading station 470 (FIG. 4B), where items are transferred onto a surface of a waiting delivery vehicle 140 (FIG. 3).

Figure 5A:
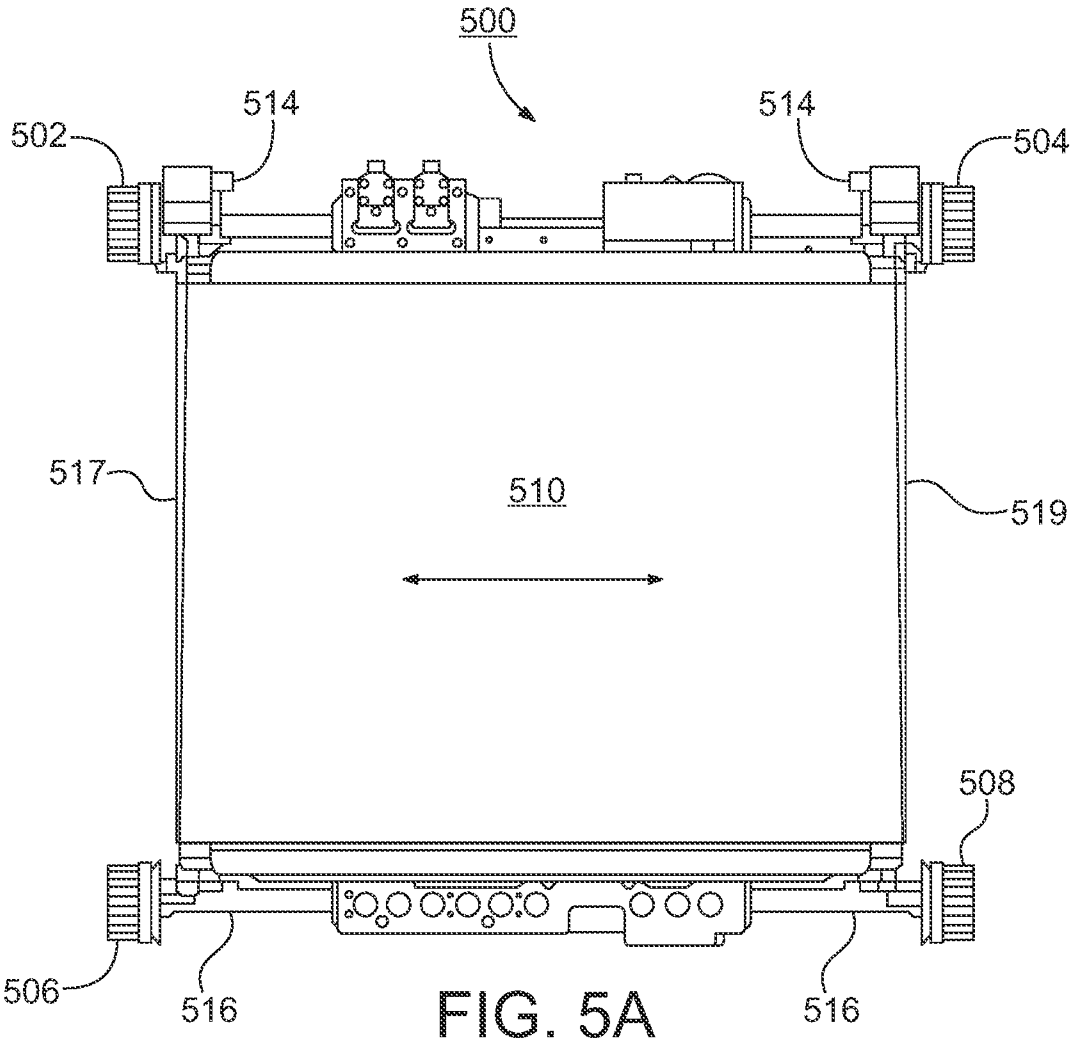
FIG. 5A is a top plan view of an autonomous delivery vehicle configured to accept an item transferred from an item characterizing induct module, to transport the item to a destination area, and to discharge the item into the destination area, according to one or more embodiments consistent with the present disclosure.

FIG. 5A is a top plan view of an exemplary autonomous delivery vehicle 500 configured to accept an item transferred from the item characterizing induct module 400 (FIGS. 4A-C), to transport the item to a sort destination area, and to discharge the item into that destination area (or to a bin, a carton, a bag or other container maintained at the sort destination area.

Each delivery vehicle 500 is a semi-autonomous vehicle that may have an onboard power source as ultra capacitors 582 (FIG. 5D) and an onboard motor as motor 580 (FIG. 5B) to drive the vehicle to the destination areas. In some embodiments, the vehicles include toothed wheels as wheels 502, 504, 506 and 508, which engage with correspondingly dimensioned teeth of tracks which, as will be described in greater detail shortly, are aligned with the vertical columns of sort destination areas and guide each vehicle from the loading station 470 to any destination within the array. Each vehicle may include a loading/unloading mechanism 510, such as a conveyor, for loading pieces onto the vehicles and discharging the pieces from the vehicle.

In some embodiments, a pair of light planes 517 and 519 are generated during motion of the delivery vehicle 500, or during transfer of an item onto the surface of the loading/unloading mechanism 510. In the embodiment of FIGS. 5A-5E, these light planes are generated by a laser 513 (FIG. 5E) of a sensor assembly 514, which also includes a 1×K array of photo sensors 515. The output of laser 513 is collimated by a lens (not shown) into a thin laser line so as to project a first portion of plane 517 or 519 in the direction of a reflector 518 disposed proximate the opposite sidewall (sidewall 524) of vehicle 500. This line is reflected back across the discharge path of vehicle 500 and onto the photo sensor array 515 to thereby form a second portion of the plane 517 or 519. In embodiments, the height of the projected planes 517 and 519 may be on the order of 10 cm. Such dimension has been found by the inventors herein to be sufficient to detect transfer of items having a wide range of geometries, with requiring the inter-vehicle spacing to increase so much as to interfere with storage and/or recharging along a common vertical charging rail (not shown).

Figure 5B:
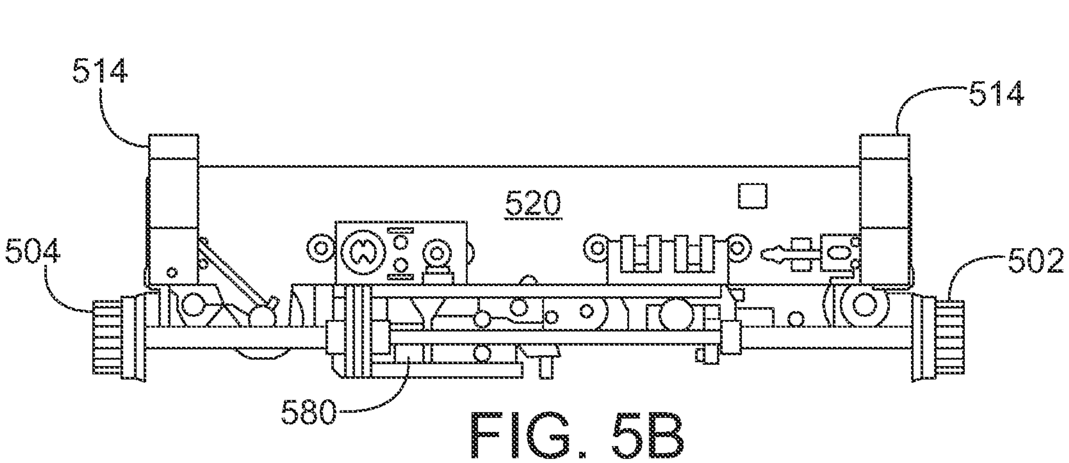
FIG. 5B is a side elevation view of the autonomous delivery vehicle of FIG. 5A, depicting the arrangement of a first item-confining side wall according to one or more embodiments consistent with the present disclosure.
Figure 5C:
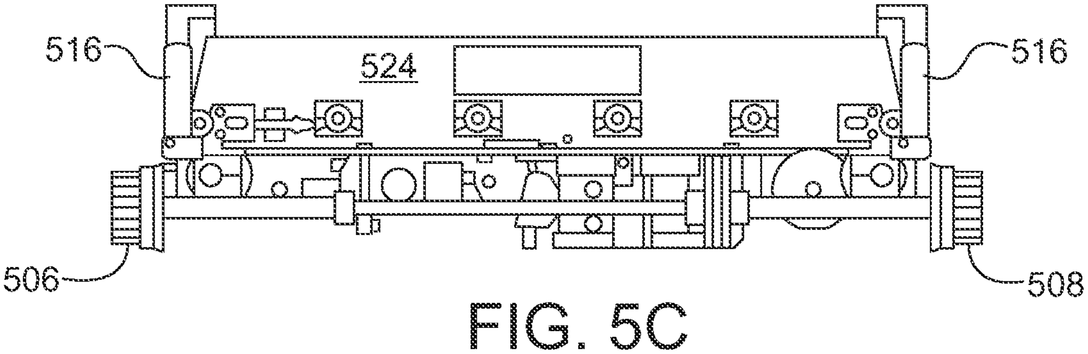
FIG. 5C is a further side elevation view of the autonomous delivery vehicle of FIG. 5A, depicting the arrangement of a second item-confining side wall according to one or more embodiments consistent with the present disclosure.
Figure 5D:
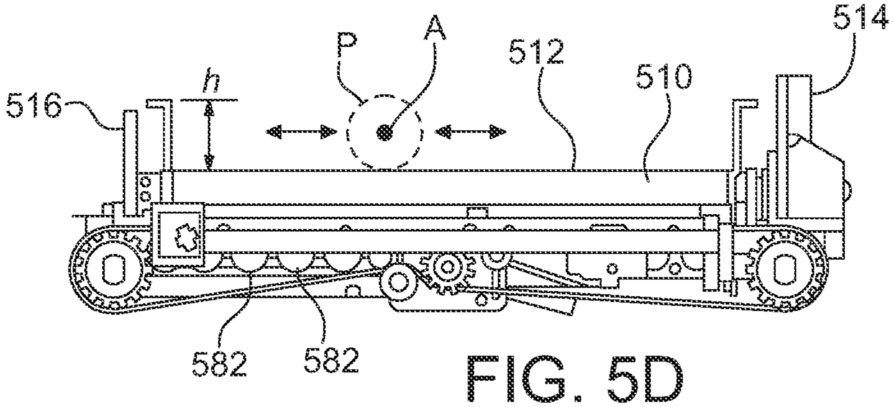
FIG. 5D is yet another elevation view of the autonomous delivery vehicle of FIGS. 5A-5C, taken from a discharge end of the vehicle and showing the arrangement of an item supporting surface bounded by the first and second item-confining side walls, according to one or more embodiments consistent with the present disclosure.
Figure 5E:
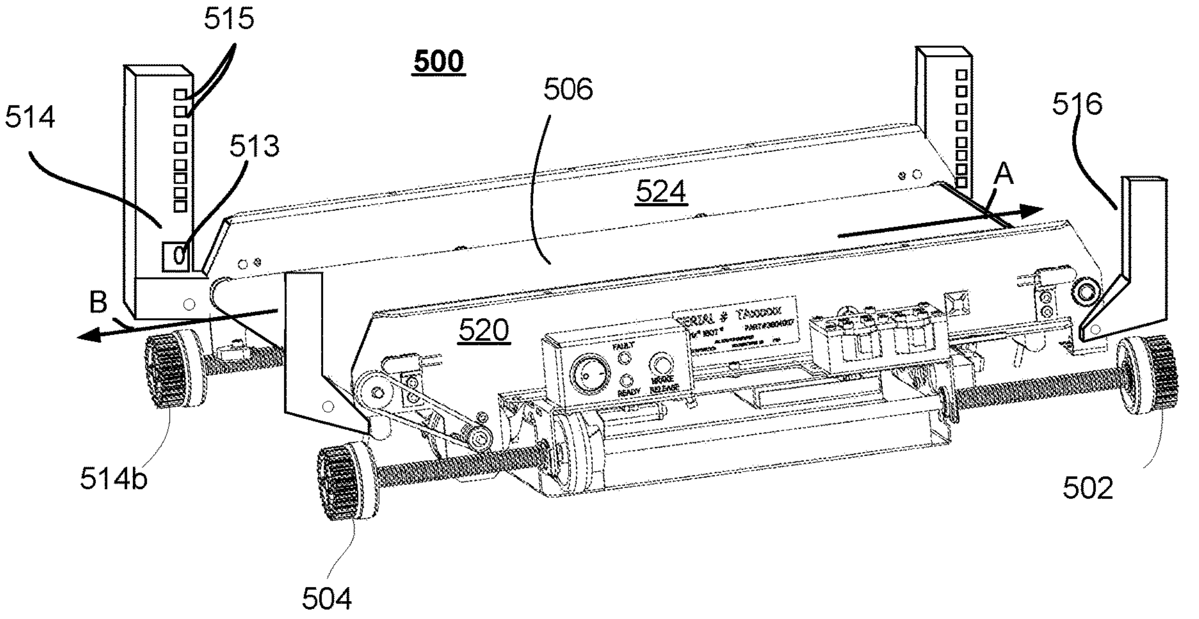
FIG. 5E is a perspective view of another embodiment of the autonomous delivery vehicle which may be utilized as part of a dynamically reconfigurable sorting array system according to one or more embodiments consistent with the present disclosure.

FIG. 5B is a side elevation view of the autonomous delivery vehicle of FIG. 5A, depicting the arrangement of a first item-confining side wall 520 according to one or more embodiments consistent with the present disclosure, while FIG. 5C is a further side elevation view of the autonomous delivery vehicle of FIG. 5A, depicting the arrangement of a second item-confining side wall 524 according to one or more embodiments consistent with the present disclosure. The inventors herein have found that certain items, particular those having a circular cross sectional profile and/or an arcuate external profile such that the items have an axis allowing complete or partial rotation during processing by a DRSAS constructed in accordance with the present invention. An exemplary item indicated generally at P in FIG. 5D, is shown having an axis of rotation A and a tendency to roll in the direction of the arrows toward or away from either lateral edge of the conveyor surface 512. To some extent, the tendency of such items as item P to roll during processing can be minimized by orienting them on the feed conveyor 444 such that the axis of rotation is parallel to the feed direction of the conveyor. However, even if such ideal orientation is achieved (and the inventors herein have observed that at higher feed rates this is not always the case, the delivery vehicles themselves move along an aisle which extends in a direction that is transverse (e.g., orthogonal) to the feed direction of the input module. The sidewalls 520 and 524 prevent items having a tendency to roll, or even to slide, from rolling or sliding off the item carrying surface 512. In an embodiment, the sidewalls 520 and 524 extend by a height h from the item supporting surface 512, which may be on the order of 3 to 5 cm for purposes of illustrative example.

FIG. 5D is yet another elevation view of the autonomous delivery vehicle 500 of FIGS. 5A-5C, taken from a discharge end of the vehicle and showing the arrangement of an item supporting surface 512 of conveyor 510 bounded by the first and second item-confining side walls, according to one or more embodiments consistent with the present disclosure.

Figure 6A:
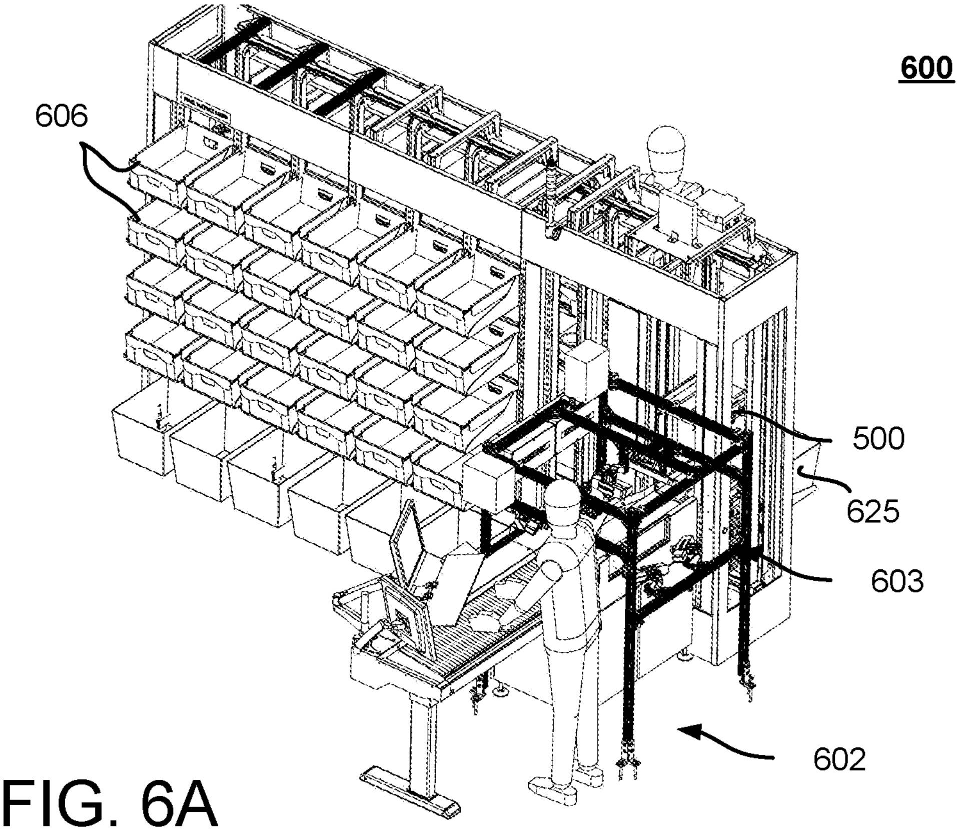
FIG. 6A is a perspective view depicting a dynamically reconfigurable sorting array system incorporating an induction module such as the one depicted in FIGS. 4A-4C, one or more vertical array(s) of sort destinations, and a plurality of autonomous delivery vehicle such as those depicted in FIGS. 5A-5D, according to one or more embodiments consistent with the present disclosure.
Figure 6B:
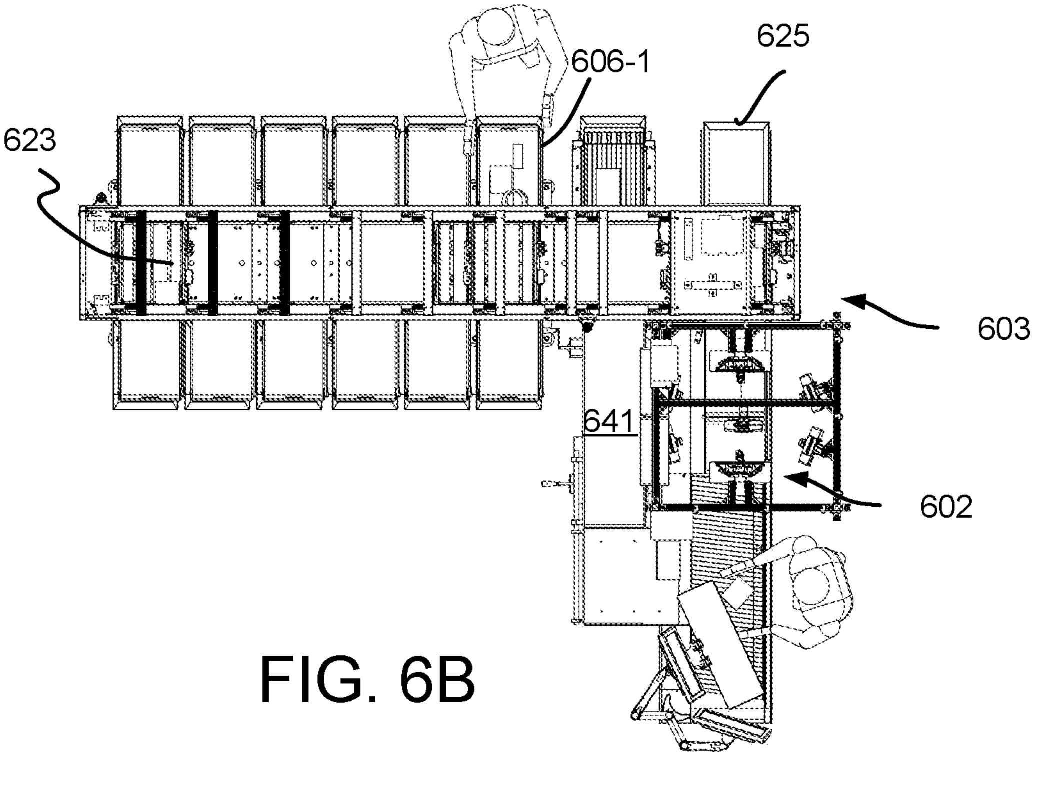
FIG. 6B is a top plan view of the reconfigurable sorting array system of FIG. 6A, according to one or more embodiments consistent with the present disclosure.
Figure 6C:
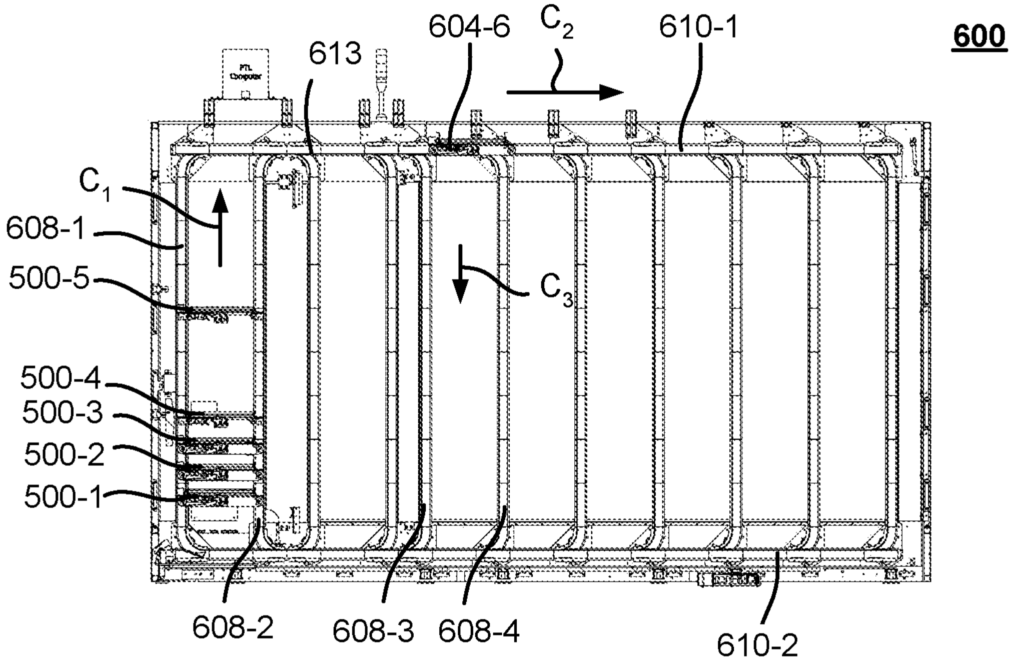
FIG. 6C is a side elevation view depicting the internal construction of an exemplary vertical sorting array structure, the array structure being characterized by a network of tracks for guiding the autonomous delivery vehicles along paths arranged to bring each vehicle into alignment with any sort location of the array structure, according to one or more embodiments.
Figure 6D:
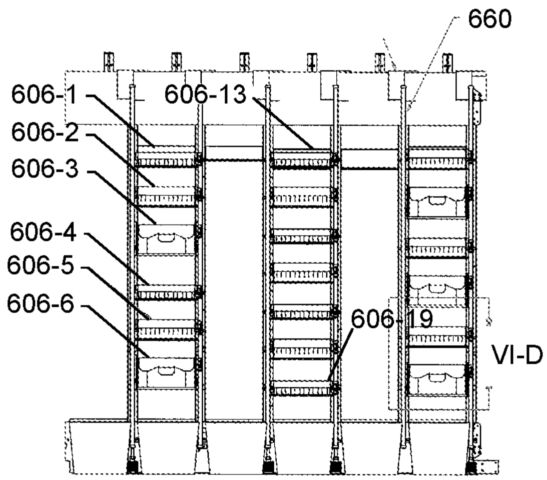
FIG. 6D is a partial side elevation view depicting the exterior arrangement of an exemplary vertical sorting array structure, the array structure defining sort destinations arranged in vertical columns, according to one or more embodiments.
Figure 6E:
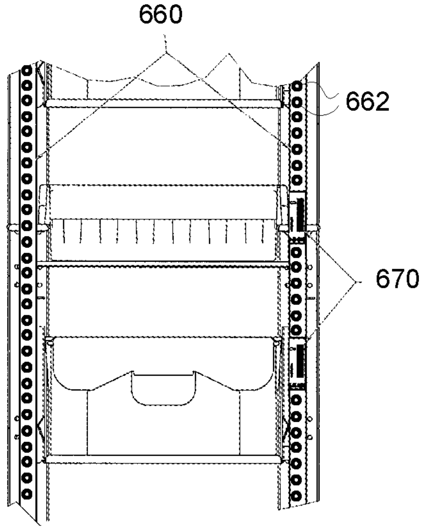
FIG. 6E is an enlarged view of the region of FIG. 6D circumscribed by the line VI-D, and showing both the arrangement of individually addressable, multiple-layer LEDs relative to each column of sort destinations and the alignment of machine readable indicia, each of which being adapted to facilitate the reporting and/or annunciation of certain events relating to use and/or operation of dynamically configurable sort array systems in accordance with one or more embodiments.

Referring now to FIGS. 6A to 6E, a DRSAS configured to sort items is designated generally 600. FIG. 6A is a perspective view depicting a dynamically reconfigurable sorting array system incorporating an induction module such as the induct module 400 depicted in FIGS. 4A-4C, one or more vertical array(s) of sort destinations, and a plurality of autonomous delivery vehicle such as vehicles 500 depicted in FIGS. 5A-5D, according to one or more embodiments consistent with the present disclosure. FIG. 6B is a top plan view of the reconfigurable sorting array system of FIG. 6A, according to one or more embodiments consistent with the present disclosure. FIG. 6C is a side elevation view depicting the internal construction of an exemplary vertical sorting array structure, the array structure being characterized by a network of tracks for guiding the autonomous delivery vehicles along paths arranged to bring each vehicle into alignment with any sort location of the array structure, according to one or more embodiments. FIG. 6D is a partial side elevation view depicting the exterior arrangement of an exemplary vertical sorting array structure, the array structure defining sort destinations arranged in vertical columns, according to one or more embodiments. FIG. 6E is an enlarged view of the region of FIG. 6D circumscribed by the line VI-D, and showing both the arrangement of individually addressable, multiple-layer LEDs relative to each column of sort destinations and the alignment of machine readable indicia, each of which being adapted to facilitate the reporting and/or annunciation of certain events relating to use and/or operation of dynamically configurable sort array systems in accordance with one or more embodiments;

The apparatus 600 includes a plurality of delivery vehicles 500 that travel along a network of tracks 608 to deliver items to a plurality of destinations or sort locations, such as output bins 606. Items are loaded onto the vehicles at a loading station 603 so that each vehicle receives an item to be delivered to a sort location. An induct station 602 serially feeds items to the loading station 603. One or more characteristic of each item can be used to control the processing of the items as the vehicles move along the tracks 608 (FIG. 6C) to the output bins. The characteristic(s) of each item may be known from each item or the characteristic(s) may be acquired by the system as the system processes the item. For instance, the induct station 602 may include one or more scanning elements for detecting one or more characteristic of the item.

From the loading station 603, the vehicles 500 travel along tracks 608 (FIG. 6C) to the destinations. The track may include a horizontal upper rail such as rail 610-1 of FIG. 6C and a horizontal lower rail 610-2, which operates as a return leg. A number of parallel vertical track legs indicated generally at 608-1 to 608-4 may extend between the upper rail and the lower return leg. The bins 606 may be arranged in columns between the vertical track legs 610.

Since the DRSAS system 600 includes a number of vehicles 500, the positioning of the vehicles is controlled to ensure that the different vehicles do not crash into each other. In embodiments of a DRSAS consistent with FIG. 3, DRSAS 600 uses a central controller that tracks the position of each vehicle 500 and provides control signals to each vehicle to control the progress of the vehicles along the track. The central controller may also control operation of the various elements along the track, such as the gates.

The following description provides details of the various elements of the system, including the induction station 602, the track system comprising tracks 608 and 610, and the vehicles 500. The manner in which the system operates will then be described. In particular, the manner in which the items are delivered may be controlled based on the characteristics of the items.

Induction Station

At the induction station 602, items are inducted into the system by serially loading items onto the vehicles 500. Since characteristics of the items may be used to control the operation of the vehicles, the system may need to know the characteristics. In one instance, the characteristics may be stored in a central database so that the characteristics are known and the system tracks the progress of the items so that the identification of the item is known as the item reaches the induction station 602. In this way, since the identification of the item is known the DRSAS 600 can retrieve data regarding the characteristics of the item, which are stored in the database. Alternatively, the items are scanned and/or weighed at the induction station 602 to identify one or more characteristic of each item.

In one embodiment, each item is manually scanned at the induction station to detect one or more features of the item. Those features are used to ascertain the identification of the item. Once the item is identified, various characteristics of the item may be retrieved from a central database and the item may be subsequently processed based on the known characteristics of the item. For instance, the induction station 602 may include a scanning station that scans for a product code, such as a bar code. Once the product code is determined, the system retrieves information regarding the product from a central database. This information is then used to control the further processing of the item as discussed further below.

In a second embodiment, the items are scanned at the induction station 602 to detect various physical characteristics of the items. For instance, the induction station 602 may measure characteristics such as the length, height and/or width of an item. Similarly, the weight or shape of the item may be detected. These characteristics may be manually or automatically detected at the induction station. For instance, a series of sensors may be used to detect the length of an item and a scale can be used to automatically weigh an item. Alternatively, an operator may analyze each item and enter information regarding each item via an input mechanism, such as a mouse, keyboard or touch screen. For instance, the system may include a touch screen that includes one or more questions or options. One example would be the packaging: is the item in a plastic bag, a blister pack or loose? Is the item flat, cylindrical or round? The system may include default characteristics so that the operator only needs to identify the characteristics for an element if the element has characteristics that vary from the default values. For instance, the default characteristic for items may be flat or rectangular. If an item is rounded (e.g. spherical or cylindrical) the operator inputs information indicating that the item is rounded and the item is subsequently processed accordingly. Based on the detected information the item is processed accordingly.

As noted above, a variety of configurations may be used for the input station, including manual or automatic configurations or a combination of manual and automated features. In a manual system, the operator enters information for each item and the system delivers the item accordingly. In an automatic system, the input system includes elements that scan each item and detect information regarding each item. The system then delivers the item according to the scanned information.

In an exemplary manual configuration, the input system includes a work station having a conveyor, an input device, such as a keyboard, and a monitor. The operator reads information on the item, such as an ID tag, inputs information from the tag into the system using the keyboard or other input device and then drops in onto a conveyor. The conveyor then conveys the piece to the loading station 603. For instance, the operator may visually read information marked on the item or the operator may use an electronic scanner, such as a bar code reader, to read a bar code or other marking on the item. Sensors positioned along the conveyor may track the piece as the conveyor transports the item toward the loading station.

Alternatively, as shown in FIGS. 4A-4C, the induction station 602 may include a scanning station 80 for automatically detecting characteristics of the items. Specifically, the induction station 602 may include feed conveyors for receiving items and conveying the items to a scanning station operable to detect one or more physical characteristics of an item. From the scanning station, a transfer conveyor 446 of FIG. 4B conveys the item to the loading station 603 where the item is either loaded onto one of the vehicles 500 or passed through to a reject bin.

The input feed conveyor may be any of a variety of conveying devices designed to convey items. In particular, the input conveyor may be designed to receive items dropped onto the conveyor. For instance, the input feed conveyor may be a horizontal conveyor belt or a horizontal roller bed formed of a plurality of generally horizontal rollers that are driven, thereby advancing items along the conveyor away from the roller.

The input feed conveyor may be configured so that an operator can select an item from a supply of items located adjacent the input conveyor. For example, a separate supply conveyor may convey a steady stream of items to the induction station 602. The operator may continuously select an item from the supply conveyor and drop the items onto the input conveyor 602. Alternatively, a large container of items may be placed adjacent the input feed conveyor, such as a bin or other container. The operator may select items one at the time from the supply bin and place each item onto the input conveyor. Still further, the input conveyor 602 may cooperate with a supply assembly that serially feeds items onto the input conveyor. For example, a supply conveyor may convey a continuous stream of items toward the input conveyor 602. The input conveyor may include a sensor for sensing when an item is conveyed away from the input conveyor. In response, the system may control the operation of both the supply conveyor and the input conveyor 602 to drive an item forwardly from the supply conveyor onto the input conveyor. In this way, items may be fed onto the input conveyor either manually by the operator or automatically by a separate feed mechanism operable to feed items to the input conveyor.

Various factors may be detected to evaluate how an item is to be processed. For instance, an item typically is identified so that the system can determine the location or bin to which the item is to be delivered. This is normally done by determining the unique product code for the item. Therefore, the system may electronically tag an item as being qualified for sorting if the system is able to identify the item using a product marking or other indicator. For example, the operator may read a product identification code on an item and enter the product code into the system using an input mechanism, such as a keyboard. If the product code entered by the operator corresponds to a proper product code, then the item may be qualified for sorting. Alternatively, if the operator enters the product code incorrectly or if the product code does not correspond to a recognized item, the system may electronically tag the item as unqualified.

Similarly, the system may include a scanning element for scanning a product identification marking on the product. By way of example, the items may be marked with one or more of a variety of markings, including, but not limited to, machine-readable optical labels, such as bar codes (e.g. QR or UPC codes), printed alphanumeric characters or a unique graphic identifier. The scanning station may include a scanner or reader for reading such a marking. For instance, a bar code reader, optical reader or RFID reader may be provided to scan the item to read the identification marking.

The reader may be a hand held device manually manipulatable by the operator, such as a handheld laser scanner, CCD reader, bar code wand or camera-based detector that scans an image of the item and analyzes the image data to attempt to identify the product identification marking. In this way, the operator can manipulate the item and/or the detection device to scan the identification marking on the item. Alternatively, the scanner or reader may be a built-in scanner, such as any of the above-mentioned devices that are built into the induction station so that the item is simply conveyed over, across or past the built-in reader, which reads the product identification marking. With such a device, the operator may pass the item over the scanner or the item may be conveyed past the scanner automatically.

Once the product identification marking is determined (either manually or automatically), the system retrieves information regarding the product and then controls the further processing of the item based on the information stored in the central database.

From the foregoing, it can be seen that a variety of different input mechanisms may be utilized to attempt to determine a product identification marking on an item. In the present instance, the scanning system includes one or more optical readers operable to scan items to obtain optical image data of the item. The system then processes the optical image data to detect the presence of a product identification marking. If a product identification marking is detected, the system analyzes the marking to determine the product identification number or code.

For example, as indicated in FIGS. 4A-4C, a scanning station according to some embodiments may include a plurality of optical imaging elements such as digital cameras, positioned along the feed conveyor. The imaging elements are spaced apart from one another and disposed around the feed conveyor so that the imaging elements can scan various sides of the item as the item is conveyed toward the loading station. Specifically, the scanning station includes one or more cameras 450 directed along a horizontal axis to scan the front and back sides of the item. In particular, the scanning station may include a plurality of imaging elements positioned along a front edge of the feed conveyor and a plurality of imaging elements positioned along a rearward edge of the feed conveyor. Additionally, the scanning station may include one or more cameras directed along a vertical axis to scan the top of the item as the item is conveyed along the feed conveyor. Further still, additional imaging elements may be provided to scan the leading and trailing faces of an item as the feed conveyor conveys the item. Additionally, the feed conveyor may include a transparent surface that the items are conveyed over so that the bottom surface of the items can be scanned by the detection station. In this way, the scanning station may include an array of sensors, reading elements, scanning elements or detectors positioned around a path of movement so that the scanning station can automatically scan an item for an identification mark while the item is conveyed along the path.

As described above, the scanning station may analyze each item to attempt to find a product identification marking to identify the item based on the marking. If the product identifier is determined the system may then determine the destination for the item and the item may be electronically tagged as qualified for sorting. Similarly, parameters for how the item should be handled by the vehicle may also be determined based information for the product code stored in a database. Conversely, if the product identifier is not determined for an item, then the item may be electronically tagged as not qualified for sorting.

In addition to analyzing the items to find a product marking, the scanning station may incorporate one or more elements operable to evaluate, analyze or measure a physical characteristic of the item to determine how the item is to be processed. For instance, the scanning station may include a scale for weighing items. If the detected weight is greater than a threshold, then the system may electronically tag the item as requiring certain handling during subsequent processing. For instance, if the weight exceeds a threshold, the system may control the subsequent processing to ensure that the item is not discharged into a destination bin into which a fragile item has been placed. Alternatively, if the weight exceeds a threshold (that may be different from the threshold noted above) the item may be tagged as not being qualified for sorting. Similarly, the scanning station may include one or more detectors for measuring a linear measurement for each item. For instance, the scanning station may measure the length, width and/or height of each item. If one of the measurements exceeds a predetermined threshold, then the system may electronically tag the item as requiring special handling during subsequent processing. The system may use any of a variety of elements to measure one or more linear dimension(s) of an item in the scanning station. For instance, the system may use beam sensors (such as an I/R emitter and an opposing I/R detector) to detect the leading and trailing edges of the item. Based on the known speed of the feed conveyor, the length of the item can be determined. Similarly, beam sensors can be oriented in a generally horizontal orientation spaced above the feed conveyor a pre-determined height. In this way, if the item breaks the beam sensors then the height of the items exceeds a pre-determined threshold so that the system electronically tags the item as not being qualified for sorting.

Further still, the operator may use an input mechanism to identify an item as being unqualified for sorting due to a physical characteristic exceeding a pre-determined threshold. For instance, a scale may be marked on the input conveyor and if the operator sees that an item is too long or too wide or too high, the operator may push a button indicating that the item has a physical characteristic that exceeds an acceptable threshold so that the item is electronically tagged as not being qualified for sorting. Similarly, a measuring gauge can be used to assess a physical characteristic of the item. One type of measuring gauge is a tunnel or chute having spaced apart sides. If the item does not fit between the walls of the chute the item exceeds the allowable height, length or width and is electronically tagged as not being qualified for sorting.

As described above, the scanning station may be configured to analyze each item to detect various characteristics of the items as the items are passed through the induction station. The system may make a qualification decision based on one or more of the characteristics detected or determined by the system. If the item is not qualified for sorting, then the item may be directed to the reject area 325 to await further processing.

Typically, items that are directed to the reject area 325 are subsequently processed manually. An operator takes each piece, identifies the piece and transports the item to the appropriate destination. Since the manual processing of rejected items is time-consuming and labor intensive, it is desirable to reduce the number of items directed to the reject area. Many of the items directed to the reject area 325 may simply have been mis-scanned. Although the items cannot be sorted without sufficient identification information, it may be possible to read the necessary information during a subsequent scan.

Since it may be desirable to re-process some non-qualified items, the information detected during the qualification can be used to identify different categories of non-qualified items. A first type of non-qualified item is a reject item that is directed to the reject area. In the following discussion, these items will be referred to as rejected items. A second type of non-qualified item is one that is not qualified for sorting but is qualified to be re-processed. In the following discussion, these items will be referred to as reprocess items.

The decision on whether an item is tagged as reject, reprocess or sort can be made based on a variety of characteristics. In the present instance, the decision to tag an item as a reject is based on a physical characteristic of the item. Specifically, if an item fails to qualify due to a physical characteristic (e.g. has a linear dimension such as height, width or length that exceeds a threshold), the system electronically tags the item as rejected and the item is directed to the reject area 625 for manual processing. Similarly, if the scanning station includes a scale, an item is tagged as rejected if the weight exceeds a weight threshold. Alternatively, to accommodate special handling, the speed of the transfer conveyors may be retarded to prevent the item from inadvertently traversing the surface of a vehicle and entering the reject bin. On the other hand, if an item passes qualification based on the physical characteristics, but fails due to an inability to identify a product identification element, then the element is electronically tagged as reprocess so that the item can be reprocessed to attempt to read the product identification information. For instance, depending on the orientation of the product, the imaging elements 450 may have been unable to properly read a bar code or other identifying mark. However, since the scanning station has determined that the item meets the physical parameters for processing the item, the system may transport the item through the system to a re-induction assembly that returns the item to the entry conveyor of the induction station.

In this way, the DRSAS system 600 is operable to analyze an item to determine one or more of characteristics of the item and determine whether the item is qualified for transportation or if the item needs to be shunted away to ensure that the item is not conveyed through the system by a vehicle. By doing so, the system is able to minimize damage to the items or the system that can occur if oversized or overweight items are transported or attempted to be transported along the tracks by one of the vehicles 500. Further still, if an item is qualified for transportation, but fails to be qualified for sorting, the item can be transported to a re-induction station to attempt to re-process the item as discussed further below.

As can be seen from the foregoing, the induction station may be configured in a wide range of options. The options are not limited to those configurations described above, and may include additional features.

Additionally, in the foregoing description, the system is described as having a single induction station. However, it may be desirable to incorporate a plurality of induction stations positioned along the system 600. By using a plurality of induction stations, the feed rate of pieces may be increased. In addition, the induction stations may be configured to process different types of items. By way of still further example, a single induct station may be used to feed multiple sorting array structures. Thus, rather than immediately direct a vehicle movable within the aisle 623 (FIG. 6B) of a first array of sort destinations to proceed to one of those destinations, the discharge system of such vehicle may receive instructions to transfer the item to an another transfer conveyor dimensioned and arranged to transfer the item to a vehicle of a second plurality of vehicles moveable within the aisle of a second array of sort destinations. This process of transfer and re-transfer may be performed to any number of cascaded DRSAS modules without departing from the spirit and scope of the present invention.

The reject bin 625 is positioned so that it opposes the feed conveyor of the induction station. Additionally, the reject bin 625 is aligned with the vehicle 500 waiting at the loading station 603. In this way, a clear pathway is provided from the induction station to the reject bin 625 without requiring movement of the vehicle along the track.

Re-Induction Assembly

The system may also include a re-induction system for items that were qualified for transport but not qualified for sorting. Alternatively, items that are not qualified for sorting can simply be directed to the reject bin 625 and handled separately. Items that are qualified for transport may be transported away from the loading station to either a re-induction station or to the sorting station. Specifically, a vehicle carrying an item qualified for transport moves upwardly along the track 608-1 to the upper rail 610-1. If the item on the vehicle is tagged as re-assess, then the vehicle drives along the track to the re-induction assembly 641. The vehicle 500 then discharges the item onto the re-induction assembly 641, which conveys the item back toward the induction conveyor so that the item can be re-processed through the induction assembly in an attempt to qualify the item for sorting.

The re-induction assembly 641 comprises a pathway between the track and the induction station (induct module) to facilitate return of re-assess items to the induction station. The re-induction assembly 641 my comprise any of a number of conveyance mechanisms. The mechanisms can be driven or static, motorized or un-motorized. However, in the present instance, the re-induction assembly 641 comprises a roller bed that is angled downwardly so that items tend to roll along the roller bed. Specifically, the roller bed has an upper end at the re-induction station. The re-induction station is positioned vertically higher than the lower end of the roller bed so that gravity tends to force the item along the roller bed when the item is discharged at the upper end of the roller bed at the re-induction station.

Sorting Station

Items that are qualified for sorting by the induction station are conveyed by vehicles to the sorting array. Referring to FIGS. 6A-6E, the system includes an array of sort destinations for receiving the items. These destinations which may include shelve areas, bins as bins 606, cartons, bags, or other containers defining an interior volume for receiving groups of one or more items.

As shown in FIG. 6B, the track 610 includes a horizontal upper rail 610-1 and a horizontal lower rail 610-2. A plurality of vertical legs 608-1 to 608-4 extend between the upper horizontal leg and the lower horizontal leg 610-2. During transport, the vehicles travel up a pair of vertical legs from the loading station to the upper rail 610-2. The vehicle then travels along the upper rail until reaching the column having the appropriate bin or destination. The vehicle then travels downwardly along two front vertical posts and two parallel rear posts until reaching the appropriate bin or destination, and then discharges the item into the bin or destination area. The vehicle then continues down the vertical legs until reaching the lower horizontal leg 610-2. The vehicle then follows the lower rail back toward the loading station.

In embodiments, the track network includes a front track arrangement as shown in FIG. 6C, and a rear track arrangement as can be seen in FIG. 6B. The front and rear tracks are parallel tracks that cooperate to guide the vehicles around the track. Returning briefly to FIGS. 5A-5E, each of the vehicles includes four wheels: two forward wheel and two rearward wheels. The forward wheels ride in the front track, while the rearward wheels ride in the rear track. It should be understood that in the discussion of the track network, the front and rear track arrangements are similarly configured opposing tracks that support the forward and rearward wheels of the vehicles. Accordingly, a description of a portion of either the front or rear track also applies to the opposing front or rear track.

Referring now to FIG. 6C, a loading column is formed adjacent the output end of the induction station. The loading column is formed of a front pair of vertical rails 608-1 and 608-2, and a corresponding rearward set of vertical rails. The loading station is positioned along the loading column. The loading station is the position along the track in which the vehicle, as vehicle 500-4, is aligned with the discharge end of the feed conveyor of the induction station. In this way, an item from the induction station may be loaded onto the vehicle as it is conveyed toward the vehicle from the input station.

The details of the track are substantially similar to the track described in U.S. Pat. No. 7,861,844. The entire disclosure of U.S. Pat. No. 7,861,844 is hereby incorporated herein by reference.

As described above, the track includes a plurality of vertical legs extending between the horizontal upper and lower rails 610-1, 610-2. An intersection 613 is formed at each section of the track at which one of the vertical legs intersects one of the horizontal legs. Each intersection, such as intersection 613, may include a pivotable gate that has a smooth curved inner race and a flat outer race that has teeth that correspond to the teeth of the drive surface for the track. The gate pivots between a first position and a second position. In the first position, the gate is closed so that the straight outer race of the gate is aligned with the straight outer branch of the intersection. In the second position, the gate is open so that the curved inner race of the gate is aligned with the curved branch of the intersection.

In the foregoing description, the sorting array is described as a plurality of output bins 606. However, it should be understood that the system may include a variety of types of destinations, not simply output bins. For instance, in certain applications it may be desirable to sort items to a storage area, such as an area on a storage shelf. Alternatively, the destination may be an output device that conveys items to other locations, or it may be a carton or bag ready to be sealed and shipped when the last of item of a group as been accumulated.

The output bins 606 may be generally rectilinear containers having a bottom, two opposing sides connected to the bottom, a front wall connected to the bottom and spanning between the two sides. The bin may also have a rear wall opposing the front wall and connected to the bottom and spanning the two sides. In this way, the bin may be shaped similar to a rectangular drawer that can be pulled out from the sorting station to remove the items from the bin.

The bins in a column are vertically spaced apart from one another to provide a gap between adjacent bins. A larger gap provides more clearance space for the vehicles to discharge items into a lower bin without the bin above it interfering with the item. However, a larger gap also decreases the number of bins or the size of bins (i.e. the bin density). Therefore, there may be a compromise between the size of the gap and the bin density.

The vehicles 500 discharge items into the bins through the rearward end of the bin. Therefore, if the backside of the bin is open the vehicle can readily discharge an item into the bin through the rearward open end of the bin. However, if the bin does not have a rearward end the items may tend to fall out of the bin when the bin is withdrawn from the sort rack. Accordingly, depending on the application, the bin may have an open rearward end or a closed rearward end. If the rearward end is closed, the rear wall may be the same height as the forward wall. Alternatively, the rear wall may be shorter than the forward wall to provide an increased gap through which the items may be discharged into the bin. For instance, the rear wall may only be half the height of the forward wall. Optionally, the rear wall may be between one quarter and three quarter the height of the forward wall. For instance, the rear wall may be between one half and three quarters the height of the forward wall. Alternatively, the rear wall may be between one quarter and three quarter the height of the forward wall.

Alternatively, rather than having a fixed rear wall, the bins 606 may have moveable or collapsible rear walls. For instance, the rear wall of the bin may be displaceable vertically relative to the bottom of the bin. In particular, the rear wall may be displaceable by pressing the wall downwardly. The rear wall may be displaceable within grooves or slots formed in the side walls of the bin so that pressing the rear wall downwardly causes the rear wall to be displaced downwardly so that a portion of the rear wall projects below the bottom of the bin. In such an embodiment, the rear wall may be biased upwardly by a biasing element, such as a spring, so that the rear wall tends to remain in an upward position with the bottom edge of the rear wall above the bottom edge of the bin. The rear wall only moves downwardly in response to a force on the rear wall that exceeds the upward biasing force.

Yet another alternative bin incorporates a collapsible rear wall. Like the displaceable wall, the collapsible wall moves downwardly by pressing downwardly against the collapsible wall. The collapsible wall may be formed in a variety of configurations, such as an accordion or pleated configuration so that the wall folds downwardly when the wall is pressed downward. The collapsible wall may include a biasing element biasing the wall upwardly to an extended position.

For instance, the biasing element may include one or more springs or elastomeric elements biasing the wall upwardly to the extended position.

As discussed above, the system is operable to sort a variety of items to a plurality of destinations. One type of destination is a bin; a second type is a shelf or other location on which the item is to be stored; and a third type of destination is an output device that may be used to convey the item to a different location. The system may include one or more of each of these types or other types of destinations.

Delivery Vehicles

Each delivery vehicle 500 is a semi-autonomous vehicle having an onboard drive system, including an onboard power supply. Each vehicle includes a mechanism for loading and unloading items for delivery. An embodiment of a vehicle that may operate with the system 600 is illustrated and described in U.S. Pat. No. 7,861,844, which is incorporated herein by reference.

The vehicle 500 may incorporate any of a variety of mechanisms for loading an item onto the vehicle and discharging the item from the vehicle into one of the bins. Returning to FIG. 5, which depicts an exemplary vehicle, the loading/unloading mechanism 510 may be specifically tailored for a particular application. However, in the present instance, the loading/unloading mechanism 510 is one or more conveyor belt(s) that extend along the top surface of the vehicle, as depicted in FIG. 5. The conveyor belt(s) is/are reversible. Driving the belt(s) in a first direction displaces the item toward the rearward end of the vehicle; driving the belt(s) in a second direction displaces the item toward the forward end of the vehicle.

A conveyor motor mounted on the underside of the vehicle drives the conveyor belt(s). Specifically, the conveyor belts 510 of FIGS. 5A-5D are entrained around a forward roller at the forward edge of the vehicle, and a rearward roller at the rearward edge of the vehicle. The conveyor motor is connected with the forward roller to drive the forward roller, thereby operating the conveyor belts.

The vehicle 500 includes four wheels that are used to transport the vehicle along the track arrangement. The wheels are mounted onto two parallel spaced apart axles, so that two or the wheels are disposed along the forward edge of the vehicle and two of the wheels are disposed along the rearward edge of the vehicle.

Each wheel as wheels 502 through 508 of FIGS. 5A-5D, comprise an outer gear that cooperates with the drive surface of the track. The outer gear is fixed relative to the axle onto which it is mounted. In this way, rotating the axle operates to rotate the gear. Accordingly, when the vehicle is moving vertically the gears cooperate with the drive surface of the track to drive the vehicle along the track.

The vehicle includes an onboard motor for driving the wheels. More specifically, the drive motor is operatively connected with the axles to rotate the axles, which in turn rotates the gears of the wheels.

As the vehicle travels along the track, an item on top of the vehicle may tend to fall off the vehicle, especially as the vehicle accelerates and decelerates. In some embodiments, the vehicles, or a subset thereof, may include a retainer (not shown) to retain the element on the vehicle during delivery. The retainer may be a hold down that clamps the item against the top surface of the vehicle. For instance, the retainer may include an elongated pivotable arm. A biasing element, such as a spring, may bias the arm downwardly against the top surface of the retainer.

Alternatively, rather than using a retainer, the system may retain the item on the vehicle by controlling the operation of the vehicle. For instance, the vehicle may include a plurality of sensors (not shown) spaced apart from one another across the width of the vehicle. The sensors may be any of a variety of sensors, including, but not limited to photoelectric sensors (such as opposed through beam sensors or retroreflective sensors) or proximity sensor (such as capacitive, photoelectric or inductive proximity sensors). The sensors can be used to detect the location of the item across the width of the vehicle. Specifically, the sensors can detect how close the item is to the front side or the rear side of the vehicle. Similarly, if the sensors are proximity sensors, the sensors can detect how close the item is to the leading edge of the vehicle and/or the trailing edge of the vehicle. Further still, the sensors can detect movement of the item on the vehicle so that the system can detect the direction that the item is moving if the item is moving on the vehicle.

Based on signals from the sensors regarding the position or movement of the item on the vehicle 500, the system can control the vehicle to re-position the item to attempt to maintain the item within a desired location on the vehicle. For instance, it may be desirable to maintain the item generally centered on the top of the vehicle. The system can control the position of the item on the vehicle using any of a variety of controls. For instance, in some embodiments, the vehicles 500 include one or more conveyor belts for loading and discharging items. The items rest on the belts, so the belts are operable to drive the items toward the forward edge or the rearward edge depending on signals received from the sensors. In one example, if the signals from the sensors indicate that the item is shifted closer to the rearward edge than the forward edge, the controller can send a signal to the motor driving the belt so that the belt drives in a first direction to drive the item toward the forward edge. Similarly, if the signals from the sensors indicate that the item is shifted closer to the forward edge than the rearward edge, the controller can send a signal to the motor driving the belt so that the belt drives in a second direction to drive the item in the opposite direction to drive the item toward the rearward edge. The sensors provide continuous feedback so that the position of the item can be continuously monitored and adjusted toward the forward edge or toward the rearward edge as the item shifts. In this way, the system provides a feedback loop for providing real-time adjustment of the position of the item to retain the item within a desired area on the top of the vehicle.

Additionally, the system can monitor the location of the item relative to the leading and trailing edges of the vehicle. In response to the detected location of the element, the system can control the operation of the vehicle if the item is too close to the leading edge or too close to the trailing edge. Specifically, the system may control the acceleration and braking of the vehicle to attempt to shift the item toward the leading or trailing edge depending on the detected position. If the sensors detect that the item is positioned closer to the leading edge than the trailing edge, the vehicle may be accelerated (or the acceleration may be increased), thereby urging the item toward the trailing edge. Alternatively, the vehicle may be decelerated to urge the item toward the leading edge.

In addition to verifying or monitoring the position of an item on the vehicle, the sensors can be used to detect one or more characteristic of the item. For instance, the sensors can be used to detect the length of width of the item. The sensors may also be used to detect the general shape of the item. This information can be used during further processing of the item as discussed further below.

As discussed above, the bins 606 may include a rearward wall that is displaceable or collapsible. Accordingly, the vehicles may include a mechanism for applying a downward force on the rearward wall sufficient to overcome a biasing force retaining the wall in an upper or upright position. For instance, the vehicle may include an extendable element such as a pin or rod. When the vehicle approaches the target delivery bin the pin may be extended transversely, away from the vehicle so that the pin extends over the rearward wall of the target bin. As the vehicle nears the bin the extended pin engages the upper edge of the rear wall of the bin. Driving the vehicle downwardly drives the pin downwardly against the rearward wall. The system may control the vertical position of the vehicle to control how far the vehicle pushes down or collapses the rear wall. After the vehicle discharges the item into the bin, the extendable element may be retracted, thereby releasing the rear wall so that the biasing element displaces the rear wall upwardly into the upper position.

The vehicle 500 may be powered by an external power supply, such as a contact along the rail that provides the electric power needed to drive the vehicle. However, in the present instance, the vehicle includes an onboard power source that provides the requisite power for both the drive motor and the conveyor motor. Additionally, in the present instance, the power supply is rechargeable. Although the power supply may include a power source, such as a rechargeable battery, in the present instance, the power supply is made up of one or more ultra capacitors.

As discussed further below, the vehicle further includes a processor for controlling the operation of the vehicle in response to signals received from the central processor. Additionally, the vehicle includes a wireless transceiver so that the vehicle can continuously communicate with the central processor as it travels along the track. Alternatively, in some applications, it may be desirable to incorporate a plurality of sensors or indicators positioned along the track. The vehicle may include a reader for sensing the sensor signals and/or the indicators, as well as a central processor for controlling the operation of the vehicle in response to the sensors or indicators.

Operation

Figure 7A:
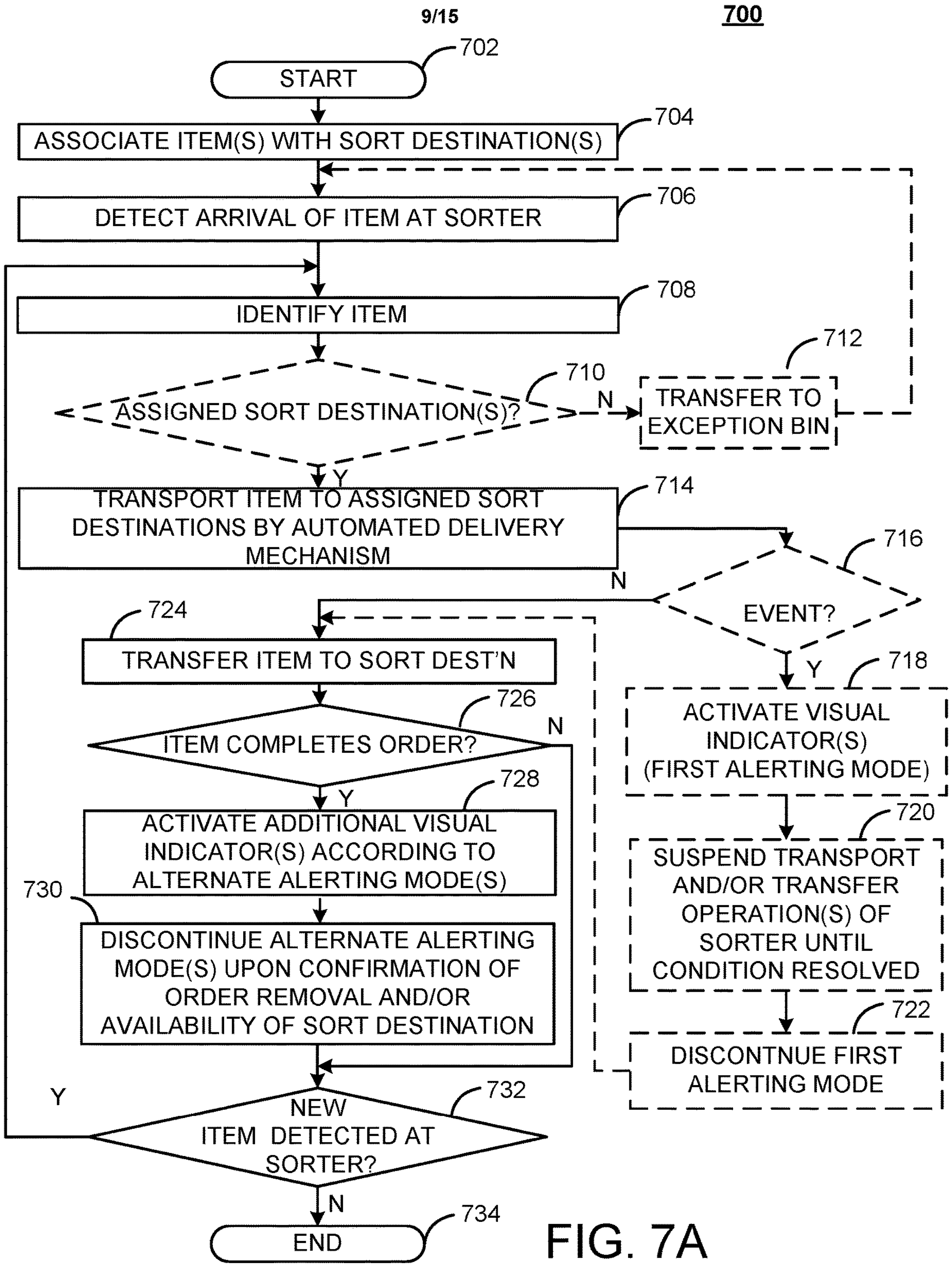
FIG. 7 is a flow diagram depicting a technique for sorting items utilizing a dynamically reconfigurable sorting array, according to one or more embodiments.

FIG. 7A is a flow diagram depicting a process 700 for sorting items utilizing a dynamically reconfigurable sorting array system such as any of the systems depicted in FIGS. 1-6E, according to one or more embodiments. The process 700 is entered at 702, and proceeds to 704 where one or more items comprising a relevant grouping are associated with a sort destination area of a sort array structure. The sort destination areas may comprise a shelf or a container such as a bin, carton, or bag. The association of groupings of items to individual sort locations may be performed on an ongoing basis (i.e., even after all available sort destinations have been associated with an item grouping. In such case, each sort destination may have a virtual queue of groupings associated therewith, such that an a priori association of multiple item groupings may be established for each sort destination. The groupings within a queue may have a default priority (e.g., a FIFO scheme) or in some embodiments, each grouping assigned to a sort destination queue may be assigned a priority class such that transfer of items belonging to a lower priority queue may be deferred until all of the higher priority groupings within the queue have been handled first. Moreover, the array is dynamically configurable in that a waiting high priority grouping may be reassigned to a different queue.

By way of alternate example, zones of sort destinations may be reserved for higher priority groupings, with groupings of items being assigned to sort destinations, on a round-robin basis as they become available. In any event, it suffices to say that a variety of methodologies—whether based on fairness or a premium delivery fee regime, may be employed to assign respective groupings of items to corresponding sort destination areas without departing from the spirit and scope of the present disclosure. The method 700 proceeds from 704 to 706, where the method 700 detects arrival of an item at an induct station of a sorter. The method proceeds to 708, where the method 700 identifies the item based, for example, on recognition of a visible indicium such as a UPC code or the like.

In some embodiments, method 700 proceeds from 708 to an optional decision process 710 where method 700 determines whether an identified item has been associated with at least one sort destination of an array of sort destinations (sort locations). If not, method 700 may query a WMS system to verify whether the item is associated with an order. Alternatively, the item may be processed, at 712, by default to either a reject bin or a bin designated for replenishment of erroneously retrieved inventory items. In still further embodiments, method 700 may assign the item to an available bin and direct further items bearing the same indicium or indicia (e.g. UPC code or SKU #) to the same location thereafter each time 710 is re-entered during execution of 700.

Where 710 and/or 712 are not executed, embodiments of method 700 proceeds directly from 708 to 714, where method 700 transports the item to an assigned sort destination via a semi-autonomous delivery vehicle. In embodiments of method 700 employing a DRSAS having an automated annunciator system, method 700 may proceed from 714 to an optional event handling process which responds to reporting of such events, for example, as a system failure or service disruption, a sort location unable to accept an item, a facility-wide emergency, or a failure to construct an item grouping at a sort destination within a predefined or configurable time window (referred to by the inventors herein as a "dwell time exceeded" event). In 716 the method 700 determines that one or more such events has occurred, the method activates, at 718 one or more visual indicator(s) according to a first annunciating and/or alerting mode. From 718, the method 700 proceeds to 720 and, if appropriate for the type of event, interrupts or suspends the transfer and/or transport of all items until the event is resolved. Upon resolution of the event, method 700 responds by discontinuing at least one event annunciating process.

Annunciation of other alerts and/or events at 718, which may correspond to information useful to operator(s) or user(s) of a DRSAS, may persist until such time as a command is received and/or the event state no longer exists. For example, a zone associated with a particular shipment to be loaded onto a truck on an expedited basis, may be delineated by energizing light emitting elements in a pattern which circumscribes the zone and/or a collection of non-contiguous sort destinations which comprise the zone. Following packaging and shipping of the item groups which had been stored at these delineated sort destinations, method 700 may proceed to 722 and discontinue the delineation.

Alternatively method 700 may proceed directly to 724 whereupon the item is transferred to a sort location. If the item so transferred completes a grouping process according to 726, method 700 may operate an annunciator module to provide visual indication of the completion event and, upon confirmation that the sort destination is ready to be placed back into service, the annunciator may either deactivate the visual indication as at 730 or it may alter the visual indication such that it continues convey other information via a different visual indication. The method 700 proceeds to 732 where, responsive to detection of a new item at the DRSAS, the system re-enters method 700 at 732.

Figure 7B:
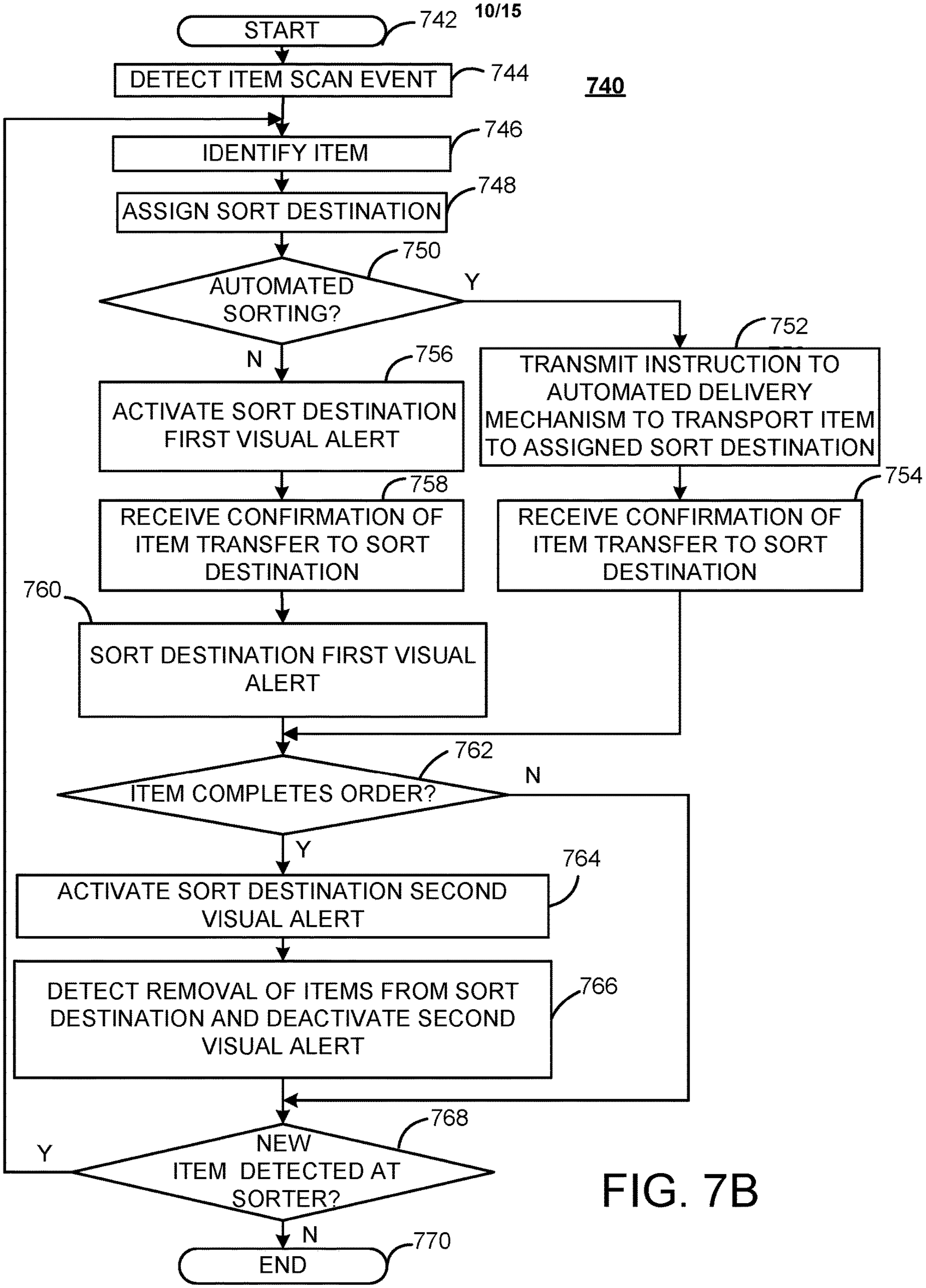

Since there may be weight, dimensional, and/or fragility considerations which prevent one or more items from being transported by an automated delivery mechanism such as been heretofore been described in connection with the process of FIG. 7A, embodiments consistent with the present disclosure facilitate implementation of both automatic and manual sortation in a single sortation array. A method 740 for implementing both manually and automatic sortation of items using a dynamically reconfigurable sorting array such as any of the systems depicted in FIGS. 1-6E is depicted in FIG. 7B.

One or more items comprising a relevant grouping are associated with a sort destination area of a sort array structure. Any such grouping may comprise one or more items to be placed in the sort destination manually, one or more items to be transferred to the sort destination by an automated delivery mechanism, or some combination of the two. As described earlier, the sort destination areas may comprise a shelf or a container such as a bin, carton, or bag, and the association of groupings of items to individual sort locations may be performed on an ongoing basis (i.e., even after all available sort destinations have been associated with an item grouping). In such case, each sort destination may have a virtual queue of groupings associated therewith, such that an a priori association of multiple item groupings may be established for each sort destination.

The process 740 is entered at 742, and proceeds to 744 where a scan event is detected. For ease of explanation, it is presumed that an a priori association has already made between each item and the manner in which such item is to be handled. According to one embodiment, items are by default classified as eligible for automatic sortation and are designated for manual handling on a by-exception basis. For example, an item that is too long, tall, heavy, or unstable to be transported by an automated delivery mechanism (e.g., a delivery vehicle) of a DRSAS may nonetheless have dimensions which permit the item to be manually inserted into an empty box, bag, or bin at a sort destination area (or to be combined with other items already present at such a location). An exemplary scan event of an item requiring manual sortation, at 744, would be registered by a handheld scanner having a wireless transceiver for transmitting data representative of an indicium read from a surface of an item. An exemplary scan event of an item eligible for automated transfer, on the other hand, might alternatively be registered as the item passes through the scanning zone of the tunnel frame 452 of the first conveyor stage 442 depicted in FIGS. 4A and 4B.

From 744, the method proceeds to 746 where an identification of the item is performed, and to 748, where a sort destination is assigned to the item. In a typical warehouse automation application, a warehouse management system such as WMS 20 (FIG. 1) associates each item with a particular sort destination based on information available from order entry and scheduling system 40 (FIG. 1). To enable the identification, the scan event may be reported directly to a WMS such as WMS 200, as by transmitting data representative of the item indicium from the scanner directly to a network interface 210 of WMS 200 (each, as shown in FIG. 2). Alternatively, the scan event may be reported to the controller 110 of the DRSAS, as DRSAS 100-1 of FIG. 2. In such embodiments, the controller of the DRSAS may relay the indicium data to the WMS and wait to receive an instruction from the WMS designating the appropriate destination area for the identified item. In other embodiments, an association between the identified item and the appropriate destination area may be provided to the controller of the DRSAS in advance.

From 748, the process proceeds to 750, where method 740 determines whether manual or automated sorting is to proceed. If automated sorting is to proceed, the method 740 advances to 752 and the processor of the DRSAS controller executes an instruction stored in memory to instruct an automated delivery mechanism (e.g., a delivery vehicle) to transport the identified item to the assigned sort destination. In exemplary embodiments, the instruction to the automated delivery mechanism is transmitted wirelessly from an interface of the DRSAS controller to an interface of a semi-autonomous delivery vehicle. From 752, the method 740 proceeds to 754, where method 740 receives confirmation that the item has been transferred to the sort destination. In exemplary embodiments, the confirmation is registered by operation of a sensor of an automated delivery vehicle. For example, the automated delivery vehicle may include one or more emitters and one or more detectors for determining whether a beam or plane has been traversed by the item during the item transfer operation.

If, on the other hand, method 740 determines at 750 that manual sorting is to proceed, then the method 740 advances instead to 756. At 756, method 740 initiates activation of a first visual alert indication (which may comprise one or more LEDs aligned with the assigned sort destination area). In an embodiment, the processor of the DRSAS controller executes instructions stored in memory to initiate activation of the first visual alert, which may be, for example, responsive to an instruction transmitted by and received from the WMS controller or based upon data previously supplied to, and stored in a memory of, the DRSAS controller. From 756, method 740 proceeds to 758.

At 758, method 740 receives confirmation that an item has been manually transferred to the assigned sort destination area. In an illustrative embodiment, an operator seeing the first visual indicator approaches a storage bin located at the assigned storage area, withdraws the storage bin, places the item within the storage bin, and returns the storage bin to its initial position. To confirm that this has been done, the same handheld scanner may be used to scan an indicium associated with the bin and/or assigned storage location and transmit data representative of that scanned indicium to the DRSAS controller and/or WMS controller. Once the confirmation has been registered at 754 or 758, method 740 proceeds to 760, where method 740 initiates de-activation (extinguishing) of the first visual alert. By way of illustrative example, the processor of the DRSAS controller may execute instructions stored in memory to de-energize one or more LEDs or other light sources comprising the first visual alert.

From 760, the method 740 proceeds to 762, where the method 740 determines whether the item just transferred to the sort destination area, whether manually or automatically, is the last item needed to complete an order. If so, method 740 proceeds to 764 and initiates activation of a second visual alert which is visually distinguishable from the first visual alert. In an exemplary embodiment, the processor of the DRSAS controller executes instructions stored in memory for causing LEDs having a different color than those associated with the first visual alert to be illuminated. Alternatively, or in addition, the second visual alert may have a flashing pattern to distinguish the second alert from a solid illumination pattern for the first visual alert.

In an illustrative embodiment, a person seeing the second visual indicator approaches the corresponding storage bin, withdraws the storage bin containing the complement of items corresponding to a complete order, replaces the withdrawn storage bin with an empty storage bin (or transfers the items to a final shipping container and returns the emptied storage bin to its initial position). To confirm that this has been done, a handheld scanner may be used to scan the indicium associated with the bin and/or assigned storage location and transmit data representative of that scanned indicium to the DRSAS controller and/or WMS controller. Having received this confirmation that the sort destination area is again available, the WMS controller and/or DRSAS controller may assign the next grouping of items in the queue to that destination. Method 740 proceeds to 766, where method 740 initiates de-activation (extinguishing) of the second visual alert. By way of illustrative example, the processor of the DRSAS controller may execute instructions stored in memory to de-energize one or more LEDs or other light sources comprising the second visual alert. If at 762 method determines that the item did not complete an order, or following completion of 766, method 740 proceeds to 768, where method 740 determines whether a new item is detected at the sorter. If a new item is not detected at the sorter then the process terminates at 770; if a new item is detected, the method returns to 746.

Figure 8:
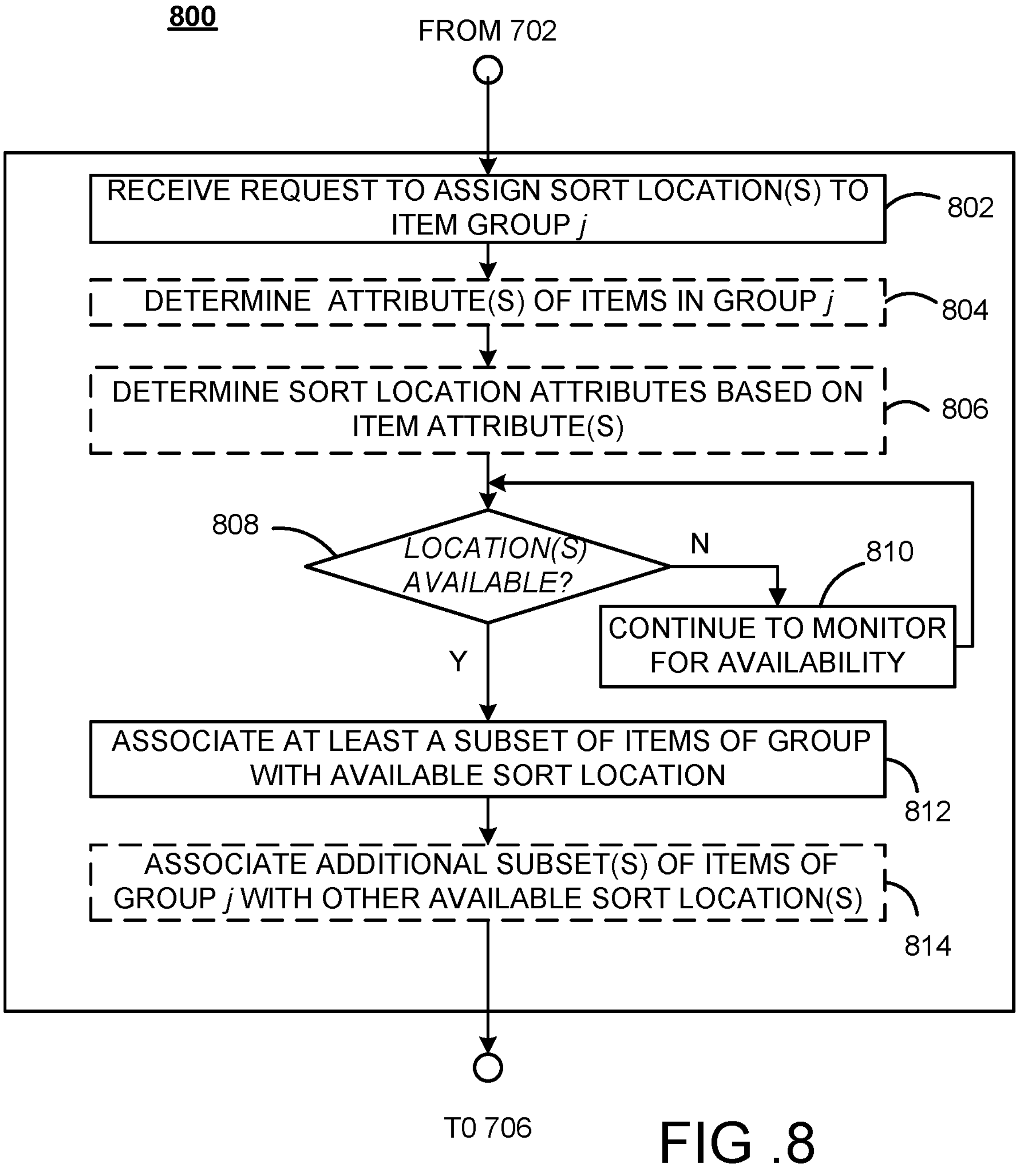
FIG. 8 is a flow diagram depicting discrete steps applicable to the assignment of items for accumulation at respective sort destinations, which may be performed as a sub-process of the technique of FIG. 7 in accordance with one or more embodiments.

FIG. 8 is a flow diagram depicting discrete steps of a process 800 applicable to the assignment of items for accumulation at respective sort destinations, which may be performed as a sub-process of the technique 700 of FIG. 7A in accordance with one or more embodiments. In an embodiment, method 800 proceeds from 702 of method 700 to 802, where a request is received to assign at least one sort location to item group j. In some embodiments, items associated with a single transaction may be allocated to more than one sort destination—particularly if the volume required to accommodate all items of a group exceeds that available, or ergonomically advisable, at any one sort destination.

In some embodiments, method 800 proceeds from 802 to optional block 804, where one or more attributes of an item are determined. The determination at 804 may be aided by real-time acquisition of data by sensors of a DRSAS and/or it may rely upon the retrieval of previously stored item characterization data accessible based on reading of an indicium present on or otherwise associated with an item. From 804, method 800 may optionally proceed to 806, where method 800 determines one or more sort locations based on the one or more acquired or retrieved item attributes (e.g, weight, height, length, chemical composition, thermal storage requirements, etc). From 802 (or 804 or 806), method 800 proceeds to 808 and determines if any sort location(s) possessing the required attributes (dimensions, height above the working surface, ambient temperature requirements, or the like). If not, method 800 proceeds to 808 and continues to monitor available DRSAS sort destinations (which may be distributed among multiple DRSAS systems) and revisit 808 until such a destination becomes available.

If the outcome of the determination at 808 is positive, method 800 proceeds to 812 and associates at least a subset of items of a grouping with an available sort location. From 812, method 800 may optionally proceed to 814, where one or more additional subsets of items of the grouping are associated with other sort locations. From 812 or 814, method 800 re-enters method 700 at 706.

Figure 9:
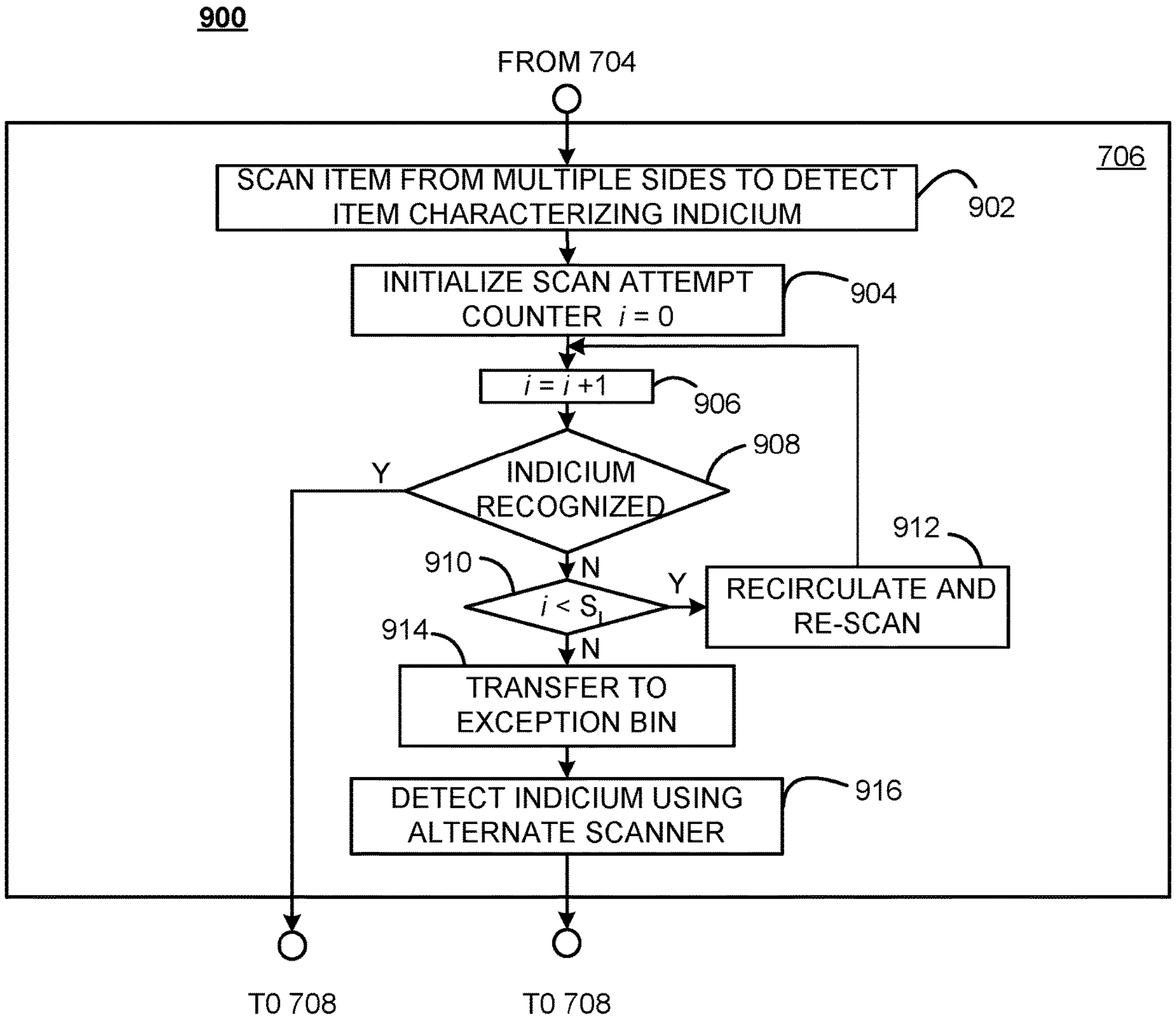
FIG. 9 is a flow diagram depicting discrete steps applicable to the characterization of items at a sort station, which may be performed as a sub-process of the technique of FIG. 7 in accordance with one or more embodiments.

FIG. 9 is a flow diagram depicting discrete steps of a process 900 applicable to the characterization of items at a sort station, which may be performed as a sub-process of the technique 700 of FIG. 7 in accordance with one or more embodiments. In some embodiments, method 900 is entered from step 704 of method 700 and may actually be performed as an implementation of process block 706 of process 700. In an embodiment method 900 is entered at 902, where an item is scanned form multiple sides to detect at least one item characterizing indicium such, for example, as a UPC code or SKU number sequence.

From 902, method 900 proceeds to a scan attempt initializing process 904 which sets a counter j to zero. The method 900 proceeds to 906 and increments by one. If the indicium is recognized at 908, method 700 is re-entered at 708. If not, a check is made at 910 to confirm that j is less than $S_1$, which corresponds to an integer value set at the maximum number of scan attempts. If so, the item is recirculated for rescanning as method 900 advances to 912 and the counter is incremented by one at 906. This attempt process is repeated until either a positive scan outcome or the number of scan attempts is exceeded. In the case of threshold $S_1$ being exceeded, method advances to 914 and the item is transferred to an exception bin. The method proceeds to 916 where an attempt to read the code with a manual scanner is attempted and/or the data for characterizing the item is entered by manually by an operator.

Figure 10:
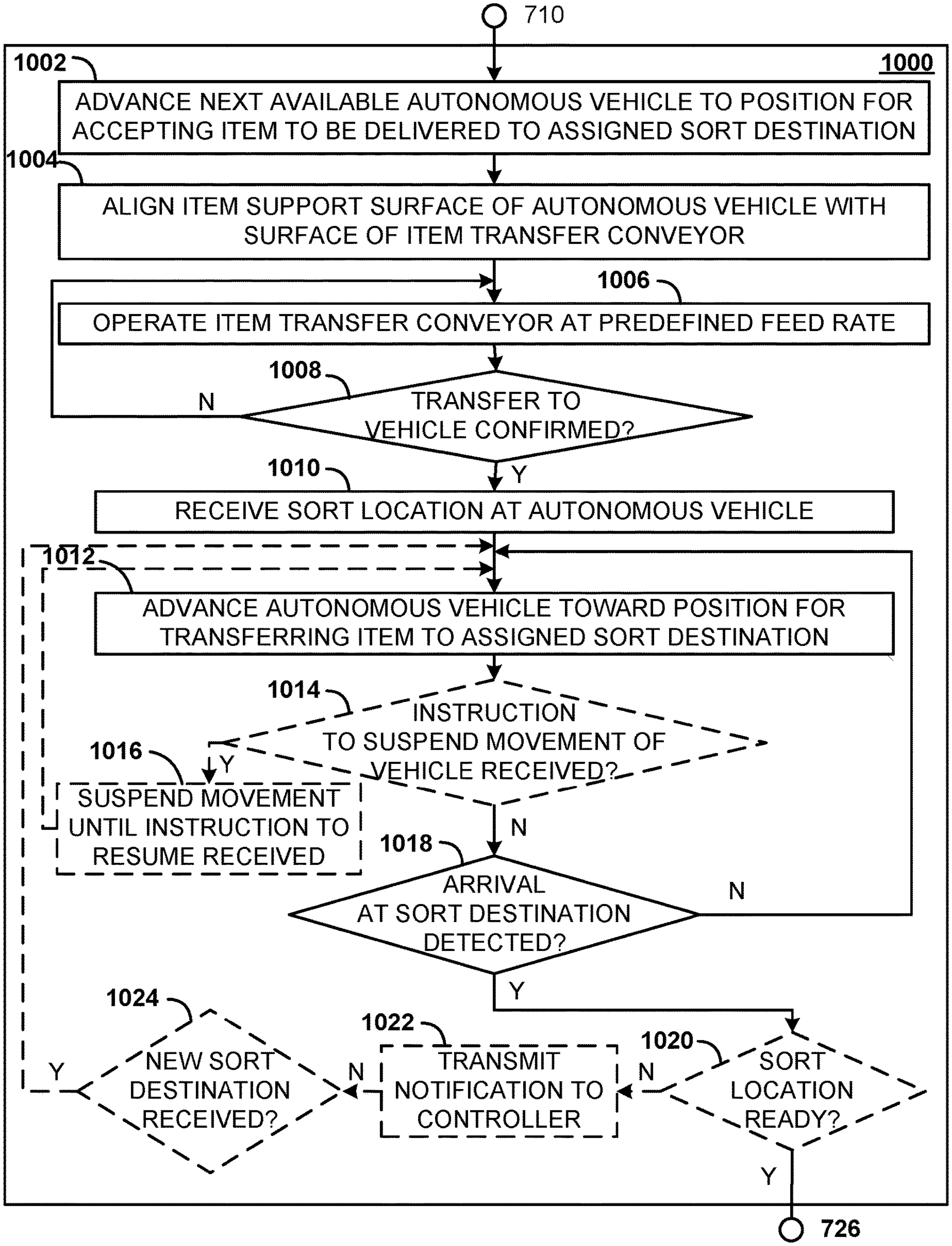
FIG. 10 is a flow diagram depicting discrete steps applicable to the transport of items, individually, by delivery vehicles movable along an array of sort locations, which may be performed as a sub-process of the technique of FIG. 7 in accordance with one or more embodiments.

FIG. 10 is a flow diagram depicting discrete steps of a process 1000 applicable to the transport of items, individually, by delivery vehicles movable along an array of sort locations, which may be performed as a sub-process of the technique 700 of FIG. 7 in accordance with one or more embodiments.

In some embodiments, method 1000 is entered from step 710 of method 700. The method comprises advancing the next available semi-autonomous vehicle to a position for accepting an item (step 1002). The item support surface of the vehicle is aligned with the item support surface of the item transfer conveyor of an induct module (step 1004). The item transfer conveyor is operated at a predefined (e.g., default) feed rate (step 1006). If transfer to the vehicle is confirmed (e.g., by sensors on the vehicle) (step 1008) the method 1000 transmits instructions to the vehicle identifying the sort location applicable to the item. The autonomous vehicle advances to the sort location (step 1012) and if no instruction to suspend movement of the vehicle is received by the vehicle (step 1014), it proceeds to the sort location until its arrival is detected (step 1018). Otherwise movement of the vehicle is suspended (step 1016) and the method returns to 1012 for further instructions. The further instructions may include a direction to convey the item to an alternate location where a group requiring that item has also been assigned. Alternatively, the vehicle may respond to detection of an event affecting the sort destination by proceeding directly to a pre-communicated "backup" sort destination. From 1018 the method determines whether the sort location is configured to receive the item (step 1020)) and if not, a notification may be transmitted to a controller (step 1020) to request a new sort location which may be received at step 2014 or, if no such location is identified, then the item may be sent to a reject bin. If the sort destination is ready, then the item is transferred and the vehicle exists method 1000 and enters, for example, step 726 of process 700.

Figure 11:
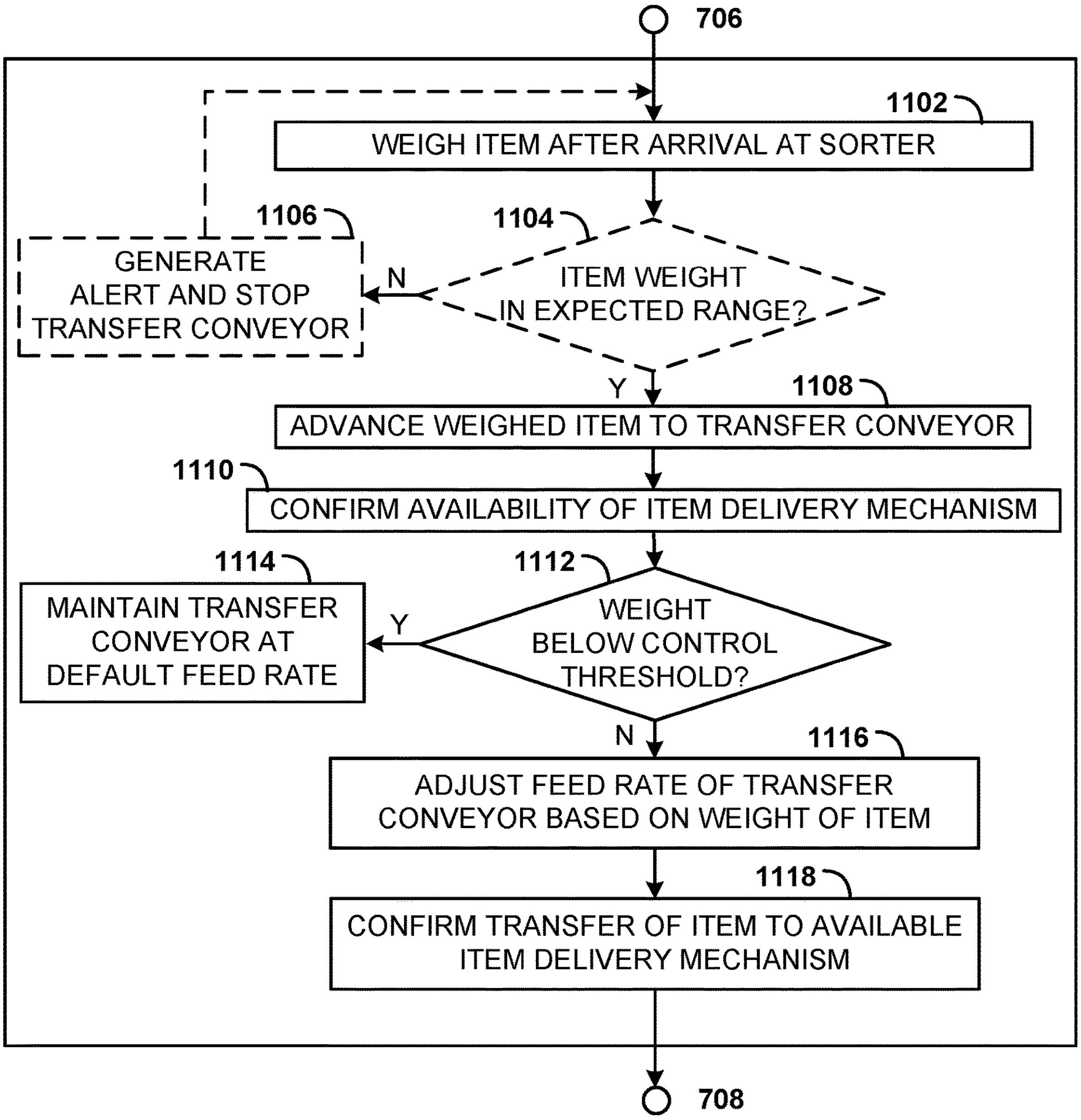
FIG. 11 is a flow diagram depicting a sequence of steps applicable to the characterization of one or more features of an item prior to a sorting operation, which may be performed as a sub-process of FIG. 7 according to one or more embodiments consistent with the present disclosure.

FIG. 11 is a flow diagram depicting a sequence of steps applicable to a process 1100 for the characterization of one or more features of an item prior to a sorting operation, which may be performed as a sub-process of the technique 700 of FIG. 7 according to one or more embodiments consistent with the present disclosure. The process 1100 may, for example, be entered prior to, during or after the performance of block 706 of process 700. From 706, the method 1100 is entered at 1102 where the item is weighed. The method proceeds, optionally, to 1104 where a determination is made as to whether the item is within an expected range. If not, the method proceeds to 1106, where an alert is generated and an instruction to stop the feed/transfer conveyor is generated. If so, the method proceeds to 1108, the weighed item is transferred to a discharge end of the transfer conveyor and availability of an item delivery mechanism (delivery vehicle) is confirmed at 1110. From 1110, the process proceeds to 1112, which performs a determination on whether a feed rate modification is needed to prevent excess momentum from causing the item to overshoot the support surface of the corresponding delivery vehicle. The determination at 1112 is below the threshold for special handling, the process 1100 advances to 1114 and a higher feed rate is maintained for the conveyor so as to handle a higher volume of items per unit of time. If however, the determination is that the item is above the threshold, the feed rate is adjusted at 1116 by retarding the speed sufficiently to avoid the overshoot condition. From 1114 or 1116, method 1100 proceeds to 1118, where method 1100 confirms transfer of the item to an available delivery vehicle. In an embodiment, the process 1100 returns to method 700 at 708.

Returning to FIGS. 5A to 6E, to prepare to receive an item, a vehicle such as vehicle 500 of FIGS. 5A to 5C moves along the track toward the loading station in the loading column shown in FIG. 6C. When the vehicle 500 (FIG. 6C) moves into position at the loading station the home sensor detects the presence of the vehicle and sends a signal to a central processor indicating that the vehicle is positioned at the loading station.

Once the vehicle is positioned at the loading station, the input station conveys an item onto the vehicle. As the item is being conveyed onto the vehicle 500, the loading mechanism 510 on the vehicle loads the item onto the vehicle. Specifically, the input station conveys the item into contact with the conveyor belt on the vehicle. The conveyor belt rotates toward the rearward side of the vehicle, thereby driving the item rearwardly on the vehicle.

The operation of the conveyor belts is controlled by loading sensors. The forward loading sensor detects the leading edge of the item as the item is loaded onto the vehicle. Once the forward loading sensor detects the trailing edge of the item, a controller onboard the vehicle determines that the item is loaded on the vehicle and stops the conveyor motor. Additionally, the onboard controller may control the operation of the conveyor in response to signals received from the rearward sensor. Specifically, if the rearward sensor detects the leading edge of the item, then the leading edge of the item is adjacent the rearward edge of the vehicle. To ensure that the item does not overhang from the rearward edge of the vehicle, the controller may stop the conveyor once the rearward sensor detects the leading edge of the item. However, if the rearward sensor detects the leading edge of the item before the forward sensor detects the trailing edge of the item, the controller may determine that there is a problem with the item (i.e. it is too long or two overlapping items were fed onto the vehicle. In such an instance, the system may tag the piece as a reject and discharge the item to the reject bin 625 positioned behind the loading station. In this way, if there is an error loading an item onto a vehicle, the item can simply be ejected into the reject bin, and a subsequent item can be loaded onto the vehicle.

After an item is loaded onto the vehicle, the vehicle moves away from the loading station. Specifically, once the onboard controller detects that an item is properly loaded onto the vehicle, the onboard controller sends a signal to start the drive motor. The drive motor rotates the axles, which in turn rotates the gears on the wheel. The gears mesh with the drive surface of the vertical rails in the loading column to drive the vehicle upwardly. Specifically, the gears and the drive surfaces mesh and operate as a rack and pinion mechanism, translating the rotational motion of the wheels into linear motion along the tracks.

Since the vehicles move up the loading column from the loading station, the destination for the vehicle does not need to be determined until after the vehicle reaches the first gate along the upper rail 110-1. For instance, if an automated system is used at the induction station to scan and determine the characteristic used to sort the items, it may take some processing time to determine the relevant characteristic and/or communicate that information with a central controller to receive destination information. The time that it takes to convey the item onto the vehicle and then convey the vehicle up the loading column will typically be sufficient time to determine the relevant characteristic for the item. However, if the characteristic is not determined by the time the vehicle reaches the upper rail, the system may declare that the item is not qualified for sorting and the vehicle may be directed to the re-induction station.

Once the item is qualified for sorting, the central controller determines the appropriate bin 606 for the item. Based on the location of the bin for the item, the route for the vehicle is determined. Specifically, the central controller determines the route for the vehicle and communicates information to the vehicle regarding the bin into which the item is to be delivered. The central controller then controls the gates along the track to direct the vehicle to the appropriate column. Once the vehicle reaches the appropriate column the vehicle moves down the column to the appropriate bin. The vehicle stops at the appropriate bin 606 and the onboard controller sends an appropriate signal to the conveyor motor to drive the conveyor belt, which drives the item forwardly to discharge the item into the bin. Specifically, the top of the vehicle aligns with the gap between the appropriate bin and the bottom edge of the bin that is immediately above the appropriate bin.

In the present instance, the orientation of the vehicles does not substantially change as the vehicles move from travelling horizontally (along the upper or lower rails) to vertically (down one of the columns). Specifically, when a vehicle is travelling horizontally, the two front geared wheels cooperate with the upper or lower horizontal rail 610-1 or 610-2 of the front track, and the two rear geared wheels cooperate with the corresponding upper or lower rail 610-1 or 610-2 of the rear track. As the vehicle passes through a gate and then into a column, the two front geared wheels engage a pair of vertical legs in the front track, and the two rear geared wheels engage the corresponding vertical legs in the rear track.

As the vehicle travels from the horizontal rails to the vertical columns or from vertical to horizontal, the tracks allow all four geared wheels to be positioned at the same height. In this way, as the vehicle travels along the track it does not skew or tilt as it changes between moving horizontally and vertically.

Traffic Control

Since the system includes a number of vehicles 500, the system controls the operation of the different vehicles to ensure the vehicles do not collide into one another. In the following discussion, this is referred to as traffic control. Exemplary methodologies for controlling the flow of traffic are described in U.S. Pat. No. 7,861,844.

In the present instance, some of the columns may have two vertical rails that are independent from the adjacent columns. For instance, the loading column has two independent rails that are not shared with the adjacent column. Therefore, vehicles can travel up the loading column without regard to the position of vehicles in the column next to the loading column. Furthermore, it may be desirable to configure the column next to the loading column so that it also has two independent vertical rails. In this way, vehicles can more freely travel up the loading column and down the adjacent column.

In the foregoing discussion, the sorting of items was described in relation to an array of bins disposed on the front of the sorting station 600. However, as illustrated in FIGS. 6A and 6B, the number of bins in the system can be doubled by attaching a rear array of bins on the back side of the sorting station. In this way, the vehicles can deliver items to bins on the front side of the sorting station by traveling to the bin and then rotating the conveyor on the vehicle forwardly to eject the piece into the front bin. Alternatively, the vehicles can deliver items to bins on the rear side of the sorting station by traveling to the bin and then rotating the conveyor on the vehicle rearwardly to eject the piece into the rear bin. Additionally, the sorting station 600 is modular and can be readily expanded as necessary simply by attaching an additional section to the left end of the sorting station.

It will be recognized by those skilled in the art that changes or modifications may be made to the above-described embodiments without departing from the broad inventive concepts of the invention. For instance, in the foregoing discussion the system is described as a series of vehicles guided by a track. However, it should be understood that the system need not include a track. For example, the vehicles may travel along the ground rather than traveling along a track. The vehicles may be guided along the ground by one or more sensors and/or a controller. Optionally, the vehicles may be guided in response to signals from other vehicles and/or from a central controller, such as a computer that monitors each of the vehicles and controls movement of the vehicles to prevent the vehicles from colliding with one another. Additionally, the central controller may provide signals to direct each vehicle along a path to a storage location or transfer location.

In addition to a system in which the vehicles move along the ground without a track, the system may incorporate a guidance assembly that includes one or more rails or other physical guides that contact a mechanism on the vehicle to direct the vehicle along a path. For instance, the vehicles may each include one or more contact elements such as wheels, rollers, guide tabs, pins or other elements that may engage the guidance assembly. The guidance assembly mail be a linear element such as a straight rail or it may be a curved element. The guidance assembly may curve within a horizontal plane so that the rail stays within a plane or the guide may curve vertically so that the rail is within a single plane. The guidance assembly may include a plurality of guides or rails vertically spaced from one another so that the vehicles may move horizontally at a plurality of vertical levels. The guide may also include an elevator for moving the vehicles between the vertically spaced rails.

As can be seen from the above, the system may be incorporated into a variety of systems that use physical guide mechanisms or guide the vehicles along open areas by directing the path to guide the vehicles to storage locations or transfer locations. As discussed above, the movement of each vehicle may be controlled in response to a determination of one or more physical characteristics of the item carried by each respective vehicle.

The embodiments of the present invention may be embodied as methods, apparatus, electronic devices, and/or computer program products. Accordingly, aspects of the present invention may be embodied in hardware and/or in software (including firmware, resident software, micro-code, and the like), which may be generally referred to herein as a "circuit" or "module". Furthermore, embodiments of the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of embodiments of the present invention may be written in an object oriented programming language, such as Java®, Smalltalk or C++, and the like. However, the computer program code for carrying out operations of embodiments of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit embodiments of the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 12:
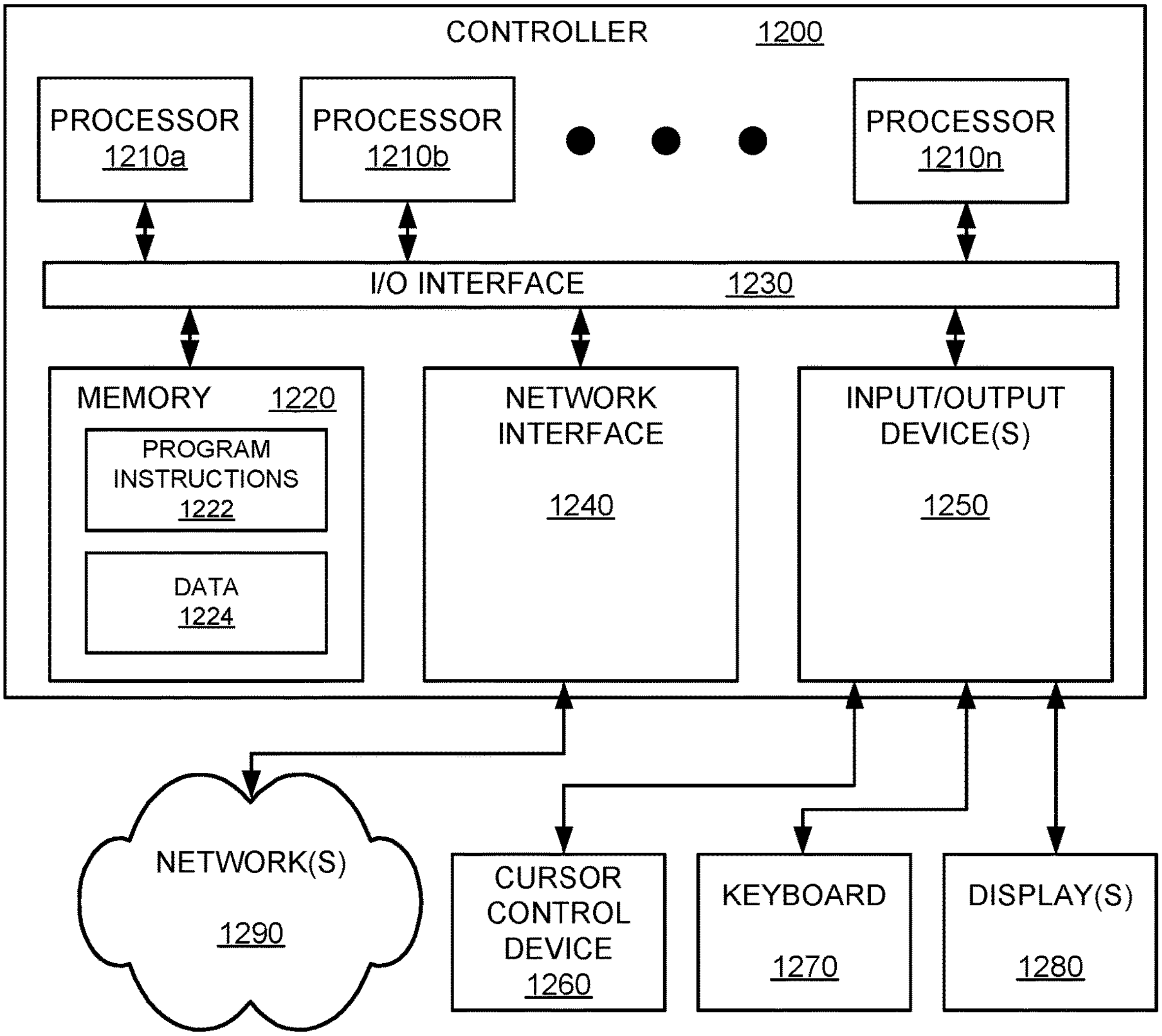
FIG. 12 is a detailed block diagram of a computer system, according to one or more embodiments, that can be utilized in various embodiments of the present invention to implement the computer and/or the display devices, according to one or more embodiments.

FIG. 12 is a detailed block diagram of a computer system, according to one or more embodiments, that can be utilized in various embodiments of the present invention to implement the computer and/or the display devices, according to one or more embodiments.

Various embodiments of method and apparatus for organizing, enhancing and presenting message content which incorporate one or more media files, as described herein, may be executed on one or more computer systems, which may interact with various other devices. One such computer system is computer system 1200 illustrated by FIG. 12, which may in various embodiments implement elements or functionality illustrated in FIGS. 1-11. In various embodiments, computer system 1200 may be configured to implement methods described above. The computer system 1200 may be used to implement any other system, device, element, functionality or method of the above-described embodiments. In the illustrated embodiments, computer system 1200 may be configured to implement method 700 (FIG. 7), method 800 (FIG. 8), method 900 (FIG. 9), method 1000 (FIG. 10), and/or method 1100 (FIG. 11) as processor-executable executable program instructions 1222 (e.g., program instructions executable by processor(s) 1210) in various embodiments.

In the illustrated embodiment, computer system 1200 includes one or more processors 1210*a*-1210*n* coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In various embodiments, any of the components may be utilized by the system to receive user input described above. In various embodiments, a user interface may be generated and displayed on display 1280. In some cases, it is contemplated that embodiments may be implemented using a single instance of computer system 1200, while in other embodiments multiple such systems, or multiple nodes making up computer system 1200, may be configured to host different portions or instances of various embodiments. For example, in one embodiment some elements may be implemented via one or more nodes of computer system 1200 that are distinct from those nodes implementing other elements. In another example, multiple nodes may implement computer system 1200 in a distributed manner.

In different embodiments, computer system 1200 may be any of various types of devices, including, but not limited to, a personal computer system, desktop computer, laptop, notebook, or netbook computer, mainframe computer system, handheld computer, workstation, network computer, application server, storage device, a peripheral device such as a switch, modem, router, or in general any type of computing or electronic device.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be general-purpose or embedded processors implementing any of a variety of instruction set architectures (ISAs). In multiprocessor systems, each of processors 1210 may commonly, but not necessarily, implement the same ISA.

System memory 1220 may be configured to store program instructions 1222 and/or data 1224 accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1220. In other embodiments, program instructions and/or data may be received, sent or stored upon different types of computer-accessible media or on similar media separate from system memory 1220 or computer system 1200.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 920, may be incorporated directly into processor 1210.

Network interface 1240 may be configured to allow data to be exchanged between computer system 1200 and other devices attached to a network (e.g., network 1290), such as one or more display devices (not shown), or one or more external systems or between nodes of computer system 1200. In various embodiments, network 1290 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1250 may, in some embodiments, include one or more communication terminals, keyboards, keypads, touchpads, scanning devices, voice or optical recognition devices, or any other devices suitable for entering or accessing data by one or more computer systems 1200. Multiple input/output devices 1250 may be present in computer system 900 or may be distributed on various nodes of computer system 1200. In some embodiments, similar input/output devices may be separate from computer system 1200 and may interact with one or more nodes of computer system 1200 through a wired or wireless connection, such as over network interface 1240.

In some embodiments, the illustrated computer system may implement any of the methods described above, such as the methods illustrated by the flowcharts of FIGS. 7-11. In other embodiments, different elements and data may be included.

Those skilled in the art will appreciate that computer system 1200 is merely illustrative and is not intended to limit the scope of embodiments. In particular, the computer system and devices may include any combination of hardware or software that can perform the indicated functions of various embodiments, including computers, network devices, and the like. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A material handling system for sorting a plurality of items into groups of one or more items, comprising:

a controller including a processor and a memory;

a rack structure defining a plurality of destination areas at vertically spaced elevations, wherein at least some destination areas of the plurality of destination areas are dimensioned and arranged to receive a container and wherein each container is dimensioned and arranged to receive a corresponding group of one or more items;

an induct station; and a plurality of delivery vehicles each configured to receive a respective item of a plurality of items and operable to transport the respective item to any destination area of the plurality of destination areas, wherein each delivery vehicle comprises a power source for driving the delivery vehicle, and a transfer mechanism operative to transfer a received item to a container disposed at a selected destination area;

wherein the processor executes instructions, stored in the memory, for controlling operation of the plurality of delivery vehicles, for determining that any destination area of the plurality of destination areas has accumulated all items required to form a corresponding complete group of items, and for providing an indication when said any destination area of the plurality of destination areas has accumulated a complete group of items.

2. The material handling system of claim 1, wherein the memory further includes instructions executable by the processor for tracking availability of the destination areas.

3. The material handling system of claim 2, wherein the memory further includes instructions executable by the processor for reserving destination areas for reassignment to other groups.

4. The material handling system of claim 1, wherein the memory further includes instructions executable by the processor for controlling the movement of each delivery vehicle to vary the speed of each vehicle as each vehicle travels to a destination area of the plurality of destination areas.

5. The material handling system of claim 1, wherein the memory further includes destination module instructions executable by the processor for identifying, for each respective group of items to be accumulated by sortation, a corresponding destination area of the plurality of destination areas.

6. The material handling system of claim 5, wherein the destination module instructions are executable by the processor to identify a destination area for at least one item of a group based on an item characteristic.

7. The material handling system of claim 1, further including a plurality of guide rails disposed within the rack structure, the guide rails being vertically spaced from one another and arranged such that the delivery vehicles are guided to move horizontally at a plurality of vertical levels.

8. A material handling system for sorting a plurality of items into groups of one or more items, comprising:
- a controller including a processor and memory;
- a plurality of destination areas defined by a rack structure and arranged at a plurality of vertical elevations relative to an underlying floor;
- a plurality of delivery vehicles each configured to move horizontally and vertically to reach any of the plurality of destination areas and each being configured to receive a respective item of a plurality of items and operable to transport the respective item to any destination area of the plurality of destination areas, wherein each delivery vehicle comprises
  - a power source for driving the delivery vehicle, and
  - a transfer mechanism operative to transfer a received item to a selected destination area;
- wherein the processor is configured to execute instructions, stored in the memory of the controller, to control operation of the plurality of vehicles, and to determine that each respective destination area of the plurality of destination areas has accumulated all items required to form a corresponding complete group of items.

9. The material handling system of claim 8, wherein the memory further includes instructions executable by the processor for providing a first indication when a first destination area has accumulated a complete group of items and for providing a second indication when the complete group of items has been removed from the first destination area.

10. The material handling system of claim 9, wherein the memory further includes instructions executable by the processor for tracking availability of the destination areas.

11. The material handling system of claim 9, wherein the memory further includes instructions executable by the processor for reserving destination areas for reassignment to other groups as the reserved destination areas become available.

12. A method of operating a material handling system to sort a plurality of items into groups of one or more items, comprising:
- operating each delivery vehicle, of a plurality of delivery vehicles, to receive a respective item of a plurality of items at an induct station;
- selecting a destination area for each received item of a plurality of received items, from among a plurality of destinations areas, wherein each destination area of the plurality of destination areas is dimensioned and arranged to receive one of the groups;
- operating a first delivery vehicle to transport a received item to a destination area selected for a first group of items, by travel vertically and horizontally from the induct station to a position of alignment with the selected destination area;
- operating the first delivery vehicle to transfer a received item to the selected destination area;
- determining that the selected destination area has accumulated all items required to form a corresponding complete group of items, and
- providing an indication when the selected destination area has accumulated the corresponding complete group of items.

13. The method of claim 12, further including tracking availability of the destination areas to receive a new group of items.

14. The method of claim 13, further including reserving destination areas for reassignment to other groups when a tracked destination area is determined to be available.

15. The method of claim 14, wherein the reserving is based on a priority status assigned to a subset of the groups of items.

16. The method of claim 12, further including providing a second indication when the complete group of items has been removed from the selected destination area.

17. The method of claim 12, further including assigning, for an order to be processed by the material handling system, one or more sort destination areas meeting applicable filter criteria.

18. The method of claim 12, further including a step of determining that a container has been removed from a destination area.

19. The method of claim 17, wherein the container is one of a bin, carton or bag.

20. The method of claim 17, further including replacing a container containing a complete group of items with an empty container.

* * * * *